United States Patent
Frykstrand Ångström et al.

(10) Patent No.: US 12,459,829 B2
(45) Date of Patent: Nov. 4, 2025

(54) AMORPHOUS ACTIVE PHARMACEUTICAL INGREDIENTS COMPRISING SUBSTANTIALLY AMORPHOUS MESOPOROUS MAGNESIUM CARBONATE

(71) Applicant: DISRUPTIVE PHARMA AB, Uppsala (SE)

(72) Inventors: Sara Frykstrand Ångström, Uppsala (SE); Ottilia Arvén, Uppsala (SE); Tuulikki Lindmark, Uppsala (SE); Peter Åsberg, Stockholm (SE)

(73) Assignee: DISRUPTIVE PHARMA AB, Uppsala (SE)

( * ) Notice: Subject to any disclaimer, the term of this patent is extended or adjusted under 35 U.S.C. 154(b) by 813 days.

(21) Appl. No.: 17/291,763

(22) PCT Filed: Nov. 6, 2019

(86) PCT No.: PCT/SE2019/051114
§ 371 (c)(1),
(2) Date: May 6, 2021

(87) PCT Pub. No.: WO2020/096513
PCT Pub. Date: May 14, 2020

(65) Prior Publication Data
US 2022/0024777 A1 Jan. 27, 2022

Related U.S. Application Data

(60) Provisional application No. 62/756,628, filed on Nov. 7, 2018.

(30) Foreign Application Priority Data

Nov. 7, 2018 (SE) .................................. 1851383-8

(51) Int. Cl.
*C01F 5/24* (2006.01)
*A61K 9/00* (2006.01)
*A61K 45/06* (2006.01)
*C01F 5/02* (2006.01)

(52) U.S. Cl.
CPC .............. *C01F 5/24* (2013.01); *A61K 9/0053* (2013.01); *A61K 45/06* (2013.01); *C01F 5/02* (2013.01); *C01P 2002/02* (2013.01); *C01P 2004/61* (2013.01); *C01P 2006/12* (2013.01); *C01P 2006/14* (2013.01); *C01P 2006/16* (2013.01)

(58) Field of Classification Search
None
See application file for complete search history.

(56) References Cited

U.S. PATENT DOCUMENTS

| 10,034,883 | B2 | 7/2018 | Prinderre | |
| 10,508,041 | B2* | 12/2019 | Strömme | B01J 20/28059 |
| 11,155,469 | B2* | 10/2021 | Strömme | B01J 20/28066 |
| 2014/0206717 | A1 | 7/2014 | Higgins et al. | |
| 2017/0246111 | A1 | 8/2017 | Monsuur et al. | |
| 2019/0127232 | A1 | 5/2019 | Cheung et al. | |

FOREIGN PATENT DOCUMENTS

| CN | 103732216 A | 4/2014 | |
| CN | 106667916 A | 5/2017 | |
| EP | 3048104 A1 * | 7/2016 | ........... C07D 473/34 |
| JP | 2016-508104 A | 3/2016 | |
| WO | WO-2009100176 A2 * | 8/2009 | ........... A61K 31/416 |
| WO | 2009/133100 A2 | 11/2009 | |
| WO | 2010/050897 A1 | 5/2010 | |
| WO | 2012/072580 A1 | 6/2012 | |
| WO | 2013/025449 A1 | 2/2013 | |
| WO | 2014/013044 A1 | 1/2014 | |
| WO | 2014/078435 A1 | 5/2014 | |
| WO | 2014/087355 A1 | 6/2014 | |
| WO | 2014/120922 A1 | 8/2014 | |
| WO | 2017/055591 A1 | 4/2017 | |
| WO | 2017/121806 A1 | 7/2017 | |
| WO | 2017/174458 A1 | 10/2017 | |
| WO | 2019/073062 A1 | 4/2019 | |
| WO | 2019/158421 A1 | 8/2019 | |

OTHER PUBLICATIONS

Zhang, P. et al. "Diffusion—Controlled Drug Release From the Mesoporous Magnesium Carbonate Upsalite®" Journal of Pharmaceutical Sciences 2016, 105, 657-663 (Year: 2016).*
Liu et al. "Improving Oral Bioavailability of Sorafenib by Optimizing the "Spring" and "Parachute" Based on Molecular Interaction Mechanisms", Mol. Pharmaceutics 2016, 13, 599-608. (Year: 2016).*
Zhang et al. "Stabilisation of amorphous ibuprofen in Upsalite, a mesoporous magnesium carbonate, as an approach to increasing the aqueous solubility of poorly soluble drugs" International Journal of Pharmaceutics 2014, 472, 185-191. (Year: 2014).*
"Tukysa® Highlights of prescribing information", revised Jan. 2023, https://www.accessdata.fda.gov/drugsatfda_docs/label/2023/213411s004lbl.pdf (accessed Sep. 5, 2024) (Year: 2023).*
Frykstrand et al., The formation of Upsalite™, a template-free, micro- and mesoporous amorphous and anhydrous magnesium carbonate nanostructure. Uppsala Universitet. PLoS One. 2013;8(7): Poster.

(Continued)

*Primary Examiner* — Bethany P Barham
*Assistant Examiner* — Judith Marie Kamm
(74) *Attorney, Agent, or Firm* — McCarter & English, LLP; Steven G. Davis; James M. Alburger

(57) ABSTRACT

A solid and substantially amorphous admixture comprising Sorafenib as active pharmaceutical ingredient (API) and a particulate anhydrous and substantially amorphous mesoporous magnesium carbonate (MMC), a method for the manufacture thereof, and an oral pharmaceutical formulation comprising the solid substantially amorphous admixture.

16 Claims, 10 Drawing Sheets

(56) References Cited

OTHER PUBLICATIONS

Ivarsson, Impact of molecular properties on the drug loading efficiency of mesoporous magnesium carbonate (Upsalite®). Uppsala Universitet. Degree Project in Pharmaceutics and Biopharmaceutics 30c, spring semester, 42 pages, (2018).

Monsuur, Mesoporous Silica, Dry Amorphisation. 7th International Symposium of Solid Oral Dosage Forms. Slideshow, 45 pages, Apr. 7-9, 2019.

Northfell, Particle size dependency on release rate from mesoporous magnesium carbonate (Upsalite®). Uppsala Universitet. Master degree project in pharmaceutics and biopharmaceutics, 30.0 c, spring semester. 42 pages, (2018).

Zhang et al., Supersaturation of poorly soluble drugs induced by mesoporous magnesium carbonate. Eur J Pharm Sci. Oct. 10, 2016;93:468-74.

Zhang, Mesoporous magnesium carbonate as a drug delivery vehicle for stabilising amorphous drugs and regulating their release rate. Uppsala Universitet. Thesis, 70 pages, (2016).

Ahlen et al., Amorphous mesoporous magnesium carbonate as a functional support for UV-blocking semiconductor nanoparticles for cosmetic applications. ACS Omega. Feb. 28, 2019;4:4429-36.

Ahlstrom. Characterizing the state of water in an amorphous magnesium carbonate using Dielectric spectroscopy. Graduate Thesis, Uppsala University. May 2013, 26 pages.

Alhalaweh et al., Computational predictions of glass-forming ability and crystallization tendency of drug molecules. Mol Pharm. 2014;11:3123-32.

Alvebratt et al., A modified in situ method to determine release from a complex drug carrier in particle-rich suspensions. AAPS PharmSciTech. Oct. 2018;19(7):2859-65.

Arven. Using Upsalite® as drug delivery vehicle: Increasing the solubility of poorly soluble drugs by stabilizing their amorphous state. Graduate Thesis, Uppsala University. Oct. 2017, 54 pages.

Baird et al., A classification system to assess the crystallization tendency of organic molecules from undercooled melts. J Pharm Sci. Sep. 2010;99(9):3787-806.

Botha et al., DTA and FT-IR analysis of the rehydration of basic magnesium carbonate. J Therm Anal Cal. 2003;71:987-95.

Chaudhari et al., Mesoporous silica as a carrier for amorphous solid dispersion. Br J Pharm Res. 2017;16(6):1-19.

Cheung et al., Nanostructure and pore size control of template-free synthesized mesoporous magnsium carbonate. RSC Advances. 2016;6:74241-9.

Clark. X-ray diffraction data for compound in the system CaO—MgO—SiO2. J Am Ceramic Society (Refractories Division No. 11). Mar. 15, 1945;29(1):25-30.

Edueng et al., The need for restructuring the disordered science of amorphous drug formulations. Pharm Res. 2017;34:1754-72.

Forsgren et al., A template-free, ultra-adsorbing, high surface area carbonate nanostructure. PLOS ONE. Jul. 2013;8(7):e68486.

Frykstrand et al., The formation of Upsalite(TM), a template-free, micro- and mesoporous amorphous and anhydrous magnesium carbonate nanostructure. Poster Presentation, Uppsala University. 2013, 1 page.

Frykstrand. Mesoporous magnesium carbonate synthesis, characterization and biocompatibility. Ph.D. Thesis, Uppsala University. May 20, 2016, 76 pages.

Mahlin et al., Early drug development predictions of glass-forming ability and physical stability of drugs. Eur J Pharm Sci. 2013;49:323-32.

Meyer et al., Comparison between different presentations of pore size distribution in porous materials. Fresenius J Anal Chem. 1999;363:174-8.

Notfors. Functionalization of Upsalite® with TiO2 for UV-blocking applications. Graduate Thesis, Uppsala University. Jun. 2016, 67 pages.

Scott et al., Magnesite formation from MgO and CO2 at the pressures and temperatures of Earth's mantle. American Mineralogist. 2013;98:1211-8.

Turova et al., Alcohol derivatives of the alkali and alkaline earth metals, magnesium, and thallium(I). Russ Chem Rev. Mar. 1965;34(3):161-85.

West et al., In Situ Formation of Alkylcarbonic Acids with CO2. J Phys Chem A. 2001;105:3947-8.

Yang et al., Amorphous magnesium carbonate nanoparticles with strong stabilizing capability for amorphous ibuprofen. Int J Pharm. Sep. 5, 2018;548(1):515-21.

Yang et al., Enhanced release of poorly water-soluble drugs from synergy between mesoporous magnesium carbonate and polymers. Int J Pharm. Jun. 15, 2017;525(1):183-190.

Zhang et al., Diffusion-controlled drug release from the mesoporous magnesium carbonate upsalite®. J Pharm Sci. Feb. 1, 2016;105(2):657-63.

Zhang et al., Stabilisation of amorphous ibuprofen in Upsalite, a mesoporous magnesium carbonate, as an approach to increasing the aqueous solubility of poorly soluble drugs. Int J Pharm. 2014;472:185-91.

\* cited by examiner

AMORPHOUS ACTIVE PHARMACEUTICAL INGREDIENTS COMPRISING SUBSTANTIALLY AMORPHOUS MESOPOROUS MAGNESIUM CARBONATE

CROSS-REFERENCE TO RELATED APPLICATIONS

This application is a 35 U.S.C. § 371 national stage filing of International Application No. PCT/SE2019/051114, filed on Nov. 6, 2019, which claims priority to Swedish Patent Application No. 1851383-8, filed on Nov. 7, 2018, and U.S. Provisional Application No. 62/756,628, filed on Nov. 7, 2018.

FIELD OF THE INVENTION

The present invention is directed to a solid and substantially amorphous active pharmaceutical ingredient, to an oral pharmaceutical formulation comprising said substantially amorphous active pharmaceutical ingredient, as well as to a method for the manufacture of the same. The invention is also directed to a particulate anhydrous and substantially amorphous mesoporous magnesium carbonate (MMC), to a method for the manufacture thereof, and the use of said particulate anhydrous and substantially amorphous mesoporous magnesium carbonate (MMC) to stabilize an active pharmaceutical ingredient (API) into a solid and substantially amorphous form.

BACKGROUND

One of the largest challenges in pharmaceutical drug development is that drug substances (Active Pharmaceutical Ingredients, API's) often are insoluble, or poorly soluble, in aqueous media. Insufficient or poor API solubility (drug solubility) provides insufficient or poor bioavailability, which in turn typically means poor plasma exposure of a drug product when administered to subjects such as humans and animals. Also fasted or fed conditions may result in significant variability in drug exposure between patients as well as variability in drug exposure for a single patient.

A drug substance is mostly used in its' crystalline form when formulated into pharmaceutical products (drug products). Crystalline forms of poorly soluble drugs have solubility limited absorption, whereas amorphous forms of drug substances provide a better solubility and dissolution rate than the corresponding crystal form. However, a problem with amorphous forms of drugs is that they almost always lack storage stability.

Approximately 40 percent of the APIs currently on the market and 70 percent of all APIs in development phase, suffer from poor aqueous solubility, as defined by the Biopharmaceutics Classification System (BCS). Consequently, problems with poorly soluble APIs already being commercialized, as well as API's in research and development pipelines, are significant. However, exact numbers differ slightly from one reference to another. Due to their challenging solubility limitations, APIs in pharmaceutical development may never reach the market for this reason.

Various formulation techniques for improving drug solubility exist, such as particle size reduction, formation of cyclodextrin complexes and amorphous formulations. The aim with these technologies is to increase the bioavailability for orally delivered drugs suffering from poor drug solubility properties. However, enhancing the aqueous solubility of orally administered drugs is a challenge in pharmaceutical drug development, since many of these techniques are expensive and/or still provides insufficient solubility improvement. Furthermore, long term stability in the amorphous phase, with only minor or no amounts of the API in crystalline form, continues to be a problem also with the currently existing techniques used in pharmaceutical formulation development.

Gupte et al. (British Journal of Pharmaceutical Research 16(6), 2017, 1-9) disclose mesoporous silica and the loading of the silica with APIs such as ibuprofen, itraconazole, and telmisartan. Gupte refers to a study where the silica is reported to stabilize itraconazole at a loading of more than 32% by weight.

WO2017/174458 discloses a mesoporous magnesium carbonate material which is stated to allow an API load of up to 60% by weight of itraconazole by soaking. Itraconazole is kept amorphous at an API load of up to 30% by weight.

Yang et al. (International Journal of Pharmaceutics 525, 2017, 183-190) disclose a mesoporous magnesium carbonate material (particle size <50 μm) comprising the APIs tolfenamic acid and rimonabant.

DESCRIPTION OF THE INVENTION

A problem underlying the present invention is to provide a solid substantially amorphous active pharmaceutical ingredient, which is maintained in essentially amorphous form during storage.

Yet a problem underlying the invention is to provide an oral pharmaceutical formulation (drug product) enabling a therapeutically sufficient API load without having to increase the size of capsules and/or tablets, which often is a concern to patients with problems to swallow too large capsules or tablets. Hence, patient compliance is a further aspect of the invention. Usually, the API load in combination with the size of a tablet or capsule is a limiting factor.

An aspect of the present invention is a solid substantially amorphous active pharmaceutical ingredient, comprising an API in an amount of at least 20% by weight, in admixture with a particulate anhydrous and substantially amorphous mesoporous magnesium carbonate (MMC), wherein said MMC has:
  (i) pores with an average pore size in the range of 2 nm to 10 nm;
  (ii) an average BET surface area in the range of 250-600 $m^2/g$;
  (iii) an average pore volume in the range of 0.5-1.2 $cm^3/g$; and
  (iv) an average particle size distribution exhibiting a $d_{10}$ value of 70-430 μm.

Yet an aspect of the present invention is a heat treated solid substantially amorphous active pharmaceutical ingredient, comprising an API in an amount of at least 20% by weight, in admixture with a particulate anhydrous and substantially amorphous mesoporous magnesium carbonate (MMC), wherein said MMC has:
  (i) pores with an average pore size in the range of 2 nm to 10 nm;
  (ii) an average BET surface area in the range of 250-600 $m^2/g$;
  (iii) an average pore volume in the range of 0.5-1.2 $cm^3/g$; and
  (iv) an average particle size distribution exhibiting a $d_{10}$ value of 70-430 μm.

Yet an aspect of the invention is a solid substantially amorphous active pharmaceutical ingredient, comprising an API in an amount of at least 20% by weight, in admixture with a particulate anhydrous and substantially amorphous mesoporous magnesium carbonate (MMC), wherein said MMC has:
(i) pores with an average pore size in the range of 2 nm to 10 nm;
(ii) an average BET surface area in the range of 250-600 m$^2$/g;
(iii) an average pore volume in the range of 0.5-1.0 cm$^3$/g; and
(iv) an average particle size distribution exhibiting a d$_{10}$ value of 70-430 µm.

Yet an aspect of the invention is a heat treated solid substantially amorphous active pharmaceutical ingredient, comprising an API in an amount of at least 20% by weight, in admixture with a particulate anhydrous and substantially amorphous mesoporous magnesium carbonate (MMC), wherein said MMC has:
(i) pores with an average pore size in the range of 2 nm to 10 nm;
(ii) an average BET surface area in the range of 250-600 m$^2$/g;
(iii) an average pore volume in the range of 0.5-1.0 cm$^3$/g; and
(iv) an average particle size distribution exhibiting a d$_{10}$ value of 70-430 µm.

Yet an aspect of the invention is a solid substantially amorphous active pharmaceutical ingredient, comprising an API in an amount of at least 20% by weight, in admixture with a particulate anhydrous and substantially amorphous mesoporous magnesium carbonate (MMC), wherein said MMC has:
(i) pores with an average pore size in the range of 2 nm to 10 nm;
(ii) an average BET surface area in the range of 250-600 m$^2$/g;
(iii) an average pore volume in the range of 0.5-0.8 cm$^3$/g; and
(iv) an average particle size distribution exhibiting a d$_{10}$ value of 70-430 µm.

Yet an aspect of the invention is a heat treated solid substantially amorphous active pharmaceutical ingredient, comprising an API in an amount of at least 20% by weight, in admixture with a particulate anhydrous and substantially amorphous mesoporous magnesium carbonate (MMC), wherein said MMC has:
(i) pores with an average pore size in the range of 2 nm to 10 nm;
(ii) an average BET surface area in the range of 250-600 m$^2$/g;
(iii) an average pore volume in the range of 0.5-0.8 cm$^3$/g; and
(iv) an average particle size distribution exhibiting a d$_{10}$ value of 70-430 µm.

Yet an aspect of the invention, is a solid substantially amorphous active pharmaceutical ingredient as disclosed and claimed herein, wherein the particulate anhydrous and substantially amorphous mesoporous magnesium carbonate (MMC) further comprises magnesium oxide (MgO).

In yet an aspect of the invention, a particulate anhydrous and substantially amorphous mesoporous magnesium carbonate (MMC) as herein described and claimed, has pores with an average pore size in the range of 3 nm to 8 nm.

In yet an aspect of the invention, a particulate anhydrous and substantially amorphous mesoporous magnesium carbonate (MMC) as herein described and claimed, has pores with an average pore size in the range of 4 nm to 7 nm.

In yet an aspect of the invention, a particulate anhydrous and substantially amorphous mesoporous magnesium carbonate (MMC) as herein described and claimed, has an average BET surface area in the range of 270-550 m$^2$/g.

In yet an aspect of the invention, a particulate anhydrous and substantially amorphous mesoporous particulate magnesium carbonate (MMC) as herein described and claimed, has an average BET surface area in the range of 290-500 m$^2$/g.

In yet an aspect of the invention, a particulate anhydrous and substantially amorphous mesoporous magnesium carbonate (MMC) as herein described and claimed, has an average BET surface area in the range of 300-450 m$^2$/g.

In yet an aspect of the invention, a particulate anhydrous and substantially amorphous mesoporous magnesium carbonate (MMC) as herein described and claimed, has an average pore volume in the range of 0.5-1.0 cm$^3$/g.

In yet an aspect of the invention, a particulate anhydrous and substantially amorphous mesoporous magnesium carbonate (MMC) as herein described and claimed, has an average pore volume in the range of 0.5-0.8 cm$^3$/g.

Yet an aspect of the invention, is a solid substantially amorphous active pharmaceutical ingredient as disclosed and claimed herein (MMC-API), wherein the amount of API is at least 25% by weight.

Yet an aspect of the invention, is a solid substantially amorphous active pharmaceutical ingredient as disclosed and claimed herein (MMC-API), wherein the amount of API is at least 30% by weight.

Yet an aspect of the invention, is a solid substantially amorphous active pharmaceutical ingredient as disclosed and claimed herein (MMC-API), wherein the amount of API is at least 35% by weight.

Yet an aspect of the invention, is a solid substantially amorphous active pharmaceutical ingredient as disclosed and claimed herein (MMC-API), wherein the amount of API is at least 40% by weight.

Yet an aspect of the invention, is a solid substantially amorphous active pharmaceutical ingredient as disclosed and claimed herein (MMC-API), wherein the amount of API is at least 45% by weight.

Yet an aspect of the invention, is a solid substantially amorphous active pharmaceutical ingredient s disclosed and claimed herein (MMC-API), wherein the amount of API is at least 50% by weight.

Yet an aspect of the invention, is a solid substantially amorphous active pharmaceutical ingredient as disclosed and claimed herein (MMC-API), wherein the amount of API is at least 55% by weight.

Yet an aspect of the invention, is a solid substantially amorphous active pharmaceutical ingredient as disclosed and claimed herein (MMC-API), wherein the amount of API is at least 60% by weight.

Yet an aspect of the invention, is a solid substantially amorphous active pharmaceutical ingredient as disclosed and claimed herein (MMC-API), wherein the amount of API is at least 65% by weight.

Yet an aspect of the invention is a solid substantially amorphous active pharmaceutical ingredient as disclosed and claimed herein (MMC-API), comprising an API in an amount of 20-60% by weight.

Yet an aspect of the invention is a solid substantially amorphous active pharmaceutical ingredient as disclosed and claimed herein (MMC-API), comprising an API in an amount of 30-50% by weight.

Yet an aspect of the invention is a solid substantially amorphous active pharmaceutical ingredient as disclosed and claimed herein (MMC-API), comprising an API in an amount of 35-50% by weight.

Yet an aspect of the invention, is a solid substantially amorphous active pharmaceutical ingredient as disclosed and claimed herein (MMC-API), wherein the API is selected from any one of azithromycin, fenofibrate, gefitinib, ibuprofen, ketoprofen, lopinavir, paclitaxel, prednisolone, ritonavir, sulfamethoxazole, telmisartan and tolfenamic acid.

Yet an aspect of the invention, is a solid substantially amorphous active pharmaceutical ingredient as disclosed and claimed herein (MMC-API), wherein the API is selected from any one of afatinib, axitinib, crizotinib erlotinib, nilotinib, nintedanib, osimertinib, panobinostat, regorafenib, rivaroxaban, selexipag, and sorafenib.

Yet an aspect of the invention, is a solid substantially amorphous active pharmaceutical ingredient as disclosed and claimed herein (MMC-API), wherein the API is selected from any one of abiraterone, aprepitant, aripiprazole, bosutinib, dapagliflozin, dasatinib, eltrombopag, ibrutinib, lesinurad, luliconazole, macitentan, palbociclib, posaconazole, rilpivirine, riociguat, trametinib, vemurafenib, and vilazodone.

Yet an aspect of the invention, is a solid substantially amorphous active pharmaceutical ingredient as disclosed and claimed herein (MMC-API), wherein said substantially amorphous active ingredient (MMC-API) has a compressibility index of 15 or less.

Yet an aspect of the invention, is a solid substantially amorphous active pharmaceutical ingredient as disclosed and claimed herein (MMC-API), wherein said substantially amorphous active ingredient (MMC-API) has a compressibility index of 12 or less.

Yet an aspect of the invention, is a solid substantially amorphous active pharmaceutical ingredient as disclosed and claimed herein (MMC-API), wherein said substantially amorphous active ingredient (MMC-API) has a compressibility index of 10 or less.

Yet an aspect of the invention, is a solid substantially amorphous active pharmaceutical ingredient as disclosed and claimed herein (MMC-API), wherein said substantially amorphous active ingredient (MMC-API) has a compressibility index of 9 or less.

Yet an aspect of the invention, is a solid substantially amorphous active pharmaceutical ingredient as disclosed and claimed herein (MMC-API), wherein said substantially amorphous active ingredient (MMC-API) has a compressibility index of 8 or less.

Yet an aspect of the invention, is a solid substantially amorphous active pharmaceutical ingredient as disclosed and claimed herein (MMC-API), wherein said substantially amorphous active ingredient (MMC-API) has a Hausner ratio of 1.18 or less.

Yet an aspect of the invention, is a solid substantially amorphous active pharmaceutical ingredient as disclosed and claimed herein (MMC-API), wherein said substantially amorphous active ingredient (MMC-API) has a Hausner ratio of 1.15 or less.

Yet an aspect of the invention, is a solid substantially amorphous active pharmaceutical ingredient as disclosed and claimed herein (MMC-API), wherein the Hausner ratio is 1.14 or less.

Yet an aspect of the invention, is a solid substantially amorphous active pharmaceutical ingredient as disclosed and claimed herein (MMC-API), wherein the Hausner ratio is 1.13 or less.

Yet an aspect of the invention, is a solid substantially amorphous active pharmaceutical ingredient as disclosed and claimed herein (MMC-API), wherein the Hausner ratio is 1.12 or less.

Yet an aspect of the invention, is a solid substantially amorphous active pharmaceutical ingredient as disclosed and claimed herein (MMC-API), wherein the Hausner ratio is 1.11 or less.

Yet an aspect of the invention, is a solid substantially amorphous active pharmaceutical ingredient as disclosed and claimed herein (MMC-API), wherein the Hausner ratio is 1.10 or less.

Yet an aspect of the invention, is a solid substantially amorphous active pharmaceutical ingredient as disclosed and claimed herein (MMC-API), comprising a particulate anhydrous mesoporous magnesium carbonate (MMC) having an average particle size distribution exhibiting a $d_{10}$ value of 80 μm or higher.

Yet an aspect of the invention, is a solid substantially amorphous active pharmaceutical ingredient as disclosed and claimed herein (MMC-API), comprising a particulate anhydrous mesoporous magnesium carbonate (MMC) having an average particle size distribution exhibiting a $d_{10}$ value of 90 μm or higher.

Yet an aspect of the invention, is a solid substantially amorphous active pharmaceutical ingredient as disclosed and claimed herein (MMC-API), comprising a particulate anhydrous mesoporous magnesium carbonate (MMC) having an average particle size distribution exhibiting a $d_{10}$ value of 70-110 μm.

Yet an aspect of the invention, is a solid substantially amorphous active pharmaceutical ingredient as disclosed and claimed herein (MMC-API), comprising a particulate anhydrous mesoporous magnesium carbonate (MMC) having an average particle size distribution exhibiting a $d_{10}$ value of 30-170 μm or a $d_{10}$ value 20-40 μm.

Yet an aspect of the invention, is a solid substantially amorphous active pharmaceutical ingredient as disclosed and claimed herein (MMC-API), comprising an anhydrous mesoporous particulate magnesium carbonate (MMC) having an average particle size distribution exhibiting a $d_{50}$ value of 75-500 μm.

Yet an aspect of the invention, is a solid substantially amorphous active pharmaceutical ingredient as disclosed and claimed herein (MMC-API), comprising a particulate anhydrous mesoporous magnesium carbonate (MMC) having an average particle size distribution exhibiting a $d_{50}$ value of 75-250 μm.

Yet an aspect of the invention, is a solid substantially amorphous active pharmaceutical ingredient as disclosed and claimed herein (MMC-API), comprising a particulate anhydrous mesoporous magnesium carbonate (MMC) having an average particle size distribution exhibiting a $d_{50}$ value of 100-250 μm.

Yet an aspect of the invention, is a solid substantially amorphous active pharmaceutical ingredient as disclosed and claimed herein (MMC-API), comprising a particulate anhydrous mesoporous magnesium carbonate (MMC) having an average particle size distribution exhibiting a $d_{50}$ value of 150-250 μm.

Yet an aspect of the invention, is a solid substantially amorphous active pharmaceutical ingredient as disclosed and claimed herein (MMC-API), comprising a particulate anhydrous mesoporous magnesium carbonate (MMC) having an average particle size distribution exhibiting a $d_{50}$ value of 170-210 μm.

Yet an aspect of the invention, is a solid substantially amorphous active pharmaceutical ingredient as disclosed and claimed herein (MMC-API), comprising a particulate anhydrous mesoporous magnesium carbonate (MMC) having an average particle size distribution exhibiting a $d_{50}$ value of 95-125 μm.

Yet an aspect of the invention, is a solid substantially amorphous active pharmaceutical ingredient as disclosed and claimed herein (MMC-API), comprising a particulate anhydrous mesoporous magnesium carbonate (MMC) having an average particle size distribution exhibiting a $d_{50}$ value of 140-230 μm.

Yet an aspect of the invention, is a solid substantially amorphous active pharmaceutical ingredient as disclosed and claimed herein (MMC-API), comprising a particulate anhydrous mesoporous magnesium carbonate (MMC) having an average particle size distribution exhibiting a $d_{50}$ value of 95-130 μm.

Yet an aspect of the invention, is a solid substantially amorphous active pharmaceutical ingredient as disclosed and claimed herein (MMC-API), comprising a particulate anhydrous mesoporous magnesium carbonate (MMC) having an average particle size distribution exhibiting a $d_{90}$ value of 260-350 μm.

Yet an aspect of the invention, is a solid substantially amorphous active pharmaceutical ingredient as disclosed and claimed herein (MMC-API), comprising a particulate anhydrous mesoporous magnesium carbonate (MMC) having an average particle size distribution exhibiting a $d_{90}$ value of 280-350 μm.

Yet an aspect of the invention, is a solid substantially amorphous active pharmaceutical ingredient as disclosed and claimed herein (MMC-API), comprising a particulate anhydrous mesoporous magnesium carbonate (MMC) having an average particle size distribution exhibiting a $d_{90}$ value of 305-350 μm.

Yet an aspect of the invention, is a solid substantially amorphous active pharmaceutical ingredient as disclosed and claimed herein (MMC-API), comprising a particulate anhydrous mesoporous magnesium carbonate (MMC) having an average particle size distribution exhibiting a $d_{90}$ value of 180-230 μm.

Yet an aspect of the invention, is a solid substantially amorphous active pharmaceutical ingredient as disclosed and claimed herein (MMC-API), comprising a particulate anhydrous mesoporous magnesium carbonate (MMC) having an average particle size distribution exhibiting a $d_{90}$ value of 180-360 μm.

A further aspect of the invention, is an oral pharmaceutical formulation, comprising a solid amorphous active pharmaceutical ingredient as disclosed and claimed herein (MMC-API), in admixture with a pharmaceutically and pharmacologically acceptable excipient, carrier, and/or diluent.

Yet an aspect of the invention, is an oral pharmaceutical formulation as disclosed and claimed herein, which is bioequivalent with said formulation.

Yet an aspect of the invention, is a particulate anhydrous and substantially amorphous mesoporous magnesium carbonate (MMC) as disclosed and claimed herein, for use in stabilizing an active pharmaceutical ingredient (API).

An aspect of the present invention, is a particulate anhydrous and substantially amorphous mesoporous magnesium carbonate (MMC) having:
(i) pores with an average pore size in the range of 2 nm to 10 nm;
(ii) an average BET surface area in the range of 250-600 m²/g;
(iii) an average pore volume in the range of 0.5-1.2 cm³/g; and
(iv) an average particle size distribution exhibiting a $d_{10}$ value of 70-430 μm.

In a further aspect of the invention, the particulate anhydrous and substantially amorphous mesoporous magnesium carbonate (MMC) as disclosed and claimed herein, may further comprise magnesium oxide (MgO).

In yet an aspect of the invention, the particulate anhydrous and substantially amorphous mesoporous magnesium carbonate (MMC) as disclosed and claimed herein has been heat treated, providing a heat treated particulate anhydrous and substantially amorphous mesoporous magnesium carbonate (MMC) as herein described and claimed.

In yet an aspect of the invention, the particulate anhydrous and substantially amorphous mesoporous magnesium carbonate (MMC) as disclosed and claimed herein, has a compressibility index of 15 or less.

In yet an aspect of the invention, the particulate anhydrous and substantially amorphous mesoporous magnesium carbonate (MMC) as disclosed and claimed herein, has a compressibility index of 12 or less.

In yet an aspect of the invention, the particulate anhydrous and substantially amorphous mesoporous magnesium carbonate (MMC) as disclosed and claimed herein, has a compressibility index of 10 or less.

In yet an aspect of the invention, the particulate anhydrous and substantially amorphous mesoporous particulate magnesium carbonate (MMC) as disclosed and claimed herein, has a compressibility index of 9 or less.

In yet an aspect of the invention, the particulate anhydrous and substantially amorphous mesoporous magnesium carbonate (MMC) as disclosed and claimed herein, has a compressibility index of 8 or less.

In yet an aspect of the invention, the particulate anhydrous and substantially amorphous mesoporous magnesium carbonate (MMC) as disclosed and claimed herein has a Hausner ratio of 1.18 or less.

In yet an aspect of the invention, the particulate anhydrous and substantially amorphous mesoporous magnesium carbonate (MMC) as disclosed and claimed herein has a Hausner ratio of 1.15 or less.

In yet an aspect of the invention, the particulate anhydrous and substantially amorphous mesoporous magnesium carbonate (MMC) as disclosed and claimed herein, has a Hausner ratio of 1.14 or less.

In yet an aspect of the invention, the particulate anhydrous and substantially amorphous mesoporous magnesium carbonate (MMC) as disclosed and claimed herein has a Hausner ratio of 1.13 or less.

In yet an aspect of the invention, the particulate anhydrous and substantially amorphous mesoporous magnesium carbonate ($MMC_3$) as disclosed and claimed herein has a Hausner ratio of 1.12 or less.

In yet an aspect of the invention, the particulate anhydrous and substantially amorphous mesoporous magnesium carbonate (MMC) as disclosed and claimed herein has a Hausner ratio of 1.11 or less.

In yet an aspect of the invention, the particulate anhydrous and substantially amorphous mesoporous magnesium carbonate (MMC) as disclosed and claimed herein has a Hausner ratio of 1.10 or less.

In yet an aspect of the invention, the particulate anhydrous and substantially amorphous mesoporous magnesium carbonate (MMC) as disclosed and claimed herein has an average particle size distribution exhibiting a $d_{10}$ value of 80 µm or higher.

In yet an aspect of the invention, the particulate anhydrous and substantially amorphous mesoporous magnesium carbonate (MMC) as disclosed and claimed herein has an average particle size distribution exhibiting a $d_{10}$ value of 90 µm or higher.

In yet an aspect of the invention, the particulate anhydrous and substantially amorphous mesoporous magnesium carbonate (MMC) as disclosed and claimed herein has an average particle size distribution exhibiting a $d_{10}$ value of 100 µm or higher.

In yet a further aspect of the invention, the particulate anhydrous and substantially amorphous mesoporous magnesium carbonate (MMC) as disclosed and claimed herein has an average particle size distribution exhibiting a $d_{10}$ value of 70-110 µm.

In yet a further aspect of the invention, the particulate anhydrous and substantially amorphous mesoporous magnesium carbonate (MMC) as disclosed and claimed herein has an average particle size distribution exhibiting a $d_{10}$ value of 30-170 µm.

In yet a further aspect of the invention, the particulate anhydrous and substantially amorphous mesoporous magnesium carbonate (MMC) as disclosed and claimed herein has an average particle size distribution exhibiting a $d_{10}$ value of 20-40 µm.

In yet a further aspect of the invention, the particulate anhydrous and substantially amorphous mesoporous magnesium carbonate (MMC) as disclosed and claimed herein has an average particle size distribution exhibiting a $d_{50}$ value of 75-500 µm.

In yet a further aspect of the invention, the particulate anhydrous and substantially amorphous mesoporous magnesium carbonate (MMC) as disclosed and claimed herein has an average particle size distribution exhibiting a $d_{50}$ value of 75-250 µm.

In yet an aspect of the invention, the particulate anhydrous and substantially amorphous mesoporous particulate magnesium carbonate (MMC) as disclosed and claimed herein has an average particle size distribution exhibiting a $d_{50}$ value of 100-250 µm.

In yet an aspect of the invention, the particulate anhydrous and substantially amorphous mesoporous magnesium carbonate (MMC) as disclosed and claimed herein has an average particle size distribution exhibiting a $d_{50}$ value of 150-250 µm.

In yet an aspect of the invention, the particulate anhydrous and substantially amorphous mesoporous magnesium carbonate (MMC) as disclosed and claimed herein has an average particle size distribution exhibiting a $d_{50}$ value of 170-210 µm.

In yet an aspect of the invention, the particulate anhydrous and substantially amorphous mesoporous magnesium carbonate (MMC) as disclosed and claimed herein has an average particle size distribution exhibiting a $d_{50}$ value of 95-125 µm.

In yet an aspect of the invention, the particulate anhydrous and substantially amorphous mesoporous magnesium carbonate (MMC) as disclosed and claimed herein has an average particle size distribution exhibiting a $d_{50}$ value of 140-230 µm.

In yet an aspect of the invention, the particulate anhydrous and substantially amorphous mesoporous magnesium carbonate (MMC) as disclosed and claimed herein has an average particle size distribution exhibiting a $d_{50}$ value of 95-230 µm.

In yet an aspect of the invention, the particulate anhydrous and substantially amorphous mesoporous magnesium carbonate (MMC) as disclosed and claimed herein has an average particle size distribution exhibiting a $d_{90}$ value of 260-350 µm.

In yet an aspect of the invention, the particulate anhydrous and substantially amorphous mesoporous magnesium carbonate (MMC) as disclosed and claimed herein has an average particle size distribution exhibiting a $d_{90}$ value of 280-350 µm.

In yet an aspect of the invention, the particulate anhydrous and substantially amorphous mesoporous magnesium carbonate (MMC) as disclosed and claimed herein has an average particle size distribution exhibiting a $d_{90}$ value of 305-350 µm.

In yet an aspect of the invention, the particulate anhydrous and substantially amorphous mesoporous magnesium carbonate (MMC) as disclosed and claimed herein has an average particle size distribution exhibiting a $d_{90}$ value of 180-360 µm.

In yet an aspect of the invention, the particulate anhydrous and substantially amorphous mesoporous magnesium carbonate (MMC) as disclosed and claimed herein has an average particle size distribution exhibiting a $d_{90}$ value of 180-230 µm.

One aspect of the invention is a solid substantially amorphous active pharmaceutical ingredient, comprising an API in an amount of at least 20% by weight, in admixture with a particulate anhydrous and substantially amorphous mesoporous magnesium carbonate (MMC), wherein said admixture of MMC and API (MMC-API) has:
  (i) pores with an average pore size in the range of 2 nm to 10 nm;
  (ii) an average BET surface area in the range of 150-600 $m^2/g$;
  (iii) an average pore volume in the range of 0.1-1.2 $cm^3/g$; and
  (iv) an average particle size distribution exhibiting a $d_{10}$ value of 70-200 µm.

Yet an aspect of the invention, is a solid substantially amorphous active pharmaceutical ingredient (MMC-API) as herein described and claimed, having pores with an average pore size in the range of 3 nm to 9 nm.

Yet an aspect of the invention, is a solid substantially amorphous active pharmaceutical ingredient (MMC-API) as herein described and claimed, having pores with an average pore size in the range of 3 nm to 8 nm.

Yet an aspect of the invention, is a solid substantially amorphous active pharmaceutical ingredient (MMC-API) as herein described and claimed, having pores with an average pore size in the range of 3 nm to 7 nm.

Yet an aspect of the invention, is a solid substantially amorphous active pharmaceutical ingredient (MMC-API) as herein described and claimed, having an average BET surface area in the range of 150-500 $m^2/g$.

Yet an aspect of the invention, is a solid substantially amorphous active pharmaceutical ingredient (MMC-API) as herein described and claimed, having an average BET surface area in the range of 170-430 $m^2/g$.

Yet an aspect of the invention, is a solid substantially amorphous active pharmaceutical ingredient (MMC-API) as herein described and claimed, having an average pore volume in the range of 0.1-0.9 $cm^3/g$.

Yet an aspect of the invention, is a solid substantially amorphous active pharmaceutical ingredient (MMC-API) as herein described and claimed, having an average pore volume in the range of 0.15-0.8 cm$^3$/g.

Yet an aspect of the invention, is a solid substantially amorphous active pharmaceutical ingredient (MMC-API) as herein described and claimed, having an average particle size distribution exhibiting a $d_{10}$ value of 80-180 µm.

Yet an aspect of the invention, is a solid substantially amorphous active pharmaceutical ingredient (MMC-API) as herein described and claimed, having an average particle size distribution exhibiting a $d_{10}$ value of 90-170 µm.

Yet an aspect of the invention, is a solid substantially amorphous active pharmaceutical ingredient (MMC-API) as herein described and claimed, having an average particle size distribution exhibiting a $d_{50}$ value of 100-300 µm.

Yet an aspect of the invention, is a solid substantially amorphous active pharmaceutical ingredient (MMC-API) as herein described and claimed, having an average particle size distribution exhibiting a $d_{50}$ value of 130-300 µm.

Yet an aspect of the invention, is a solid substantially amorphous active pharmaceutical ingredient (MMC-API) as herein described and claimed, having an average particle size distribution exhibiting a $d_{50}$ value of 150-290 µm.

Yet an aspect of the invention, is a solid substantially amorphous active pharmaceutical ingredient (MMC-API) as herein described and claimed, having an average particle size distribution exhibiting a $d_{50}$ value of 160-280 µm.

Yet an aspect of the invention, is a solid substantially amorphous active pharmaceutical ingredient (MMC-API) as herein described and claimed, having an average particle size distribution exhibiting a $d_{90}$ value of 150-450 µm.

Yet an aspect of the invention, is a solid substantially amorphous active pharmaceutical ingredient (MMC-API) as herein described and claimed, having an average particle size distribution exhibiting a $d_{90}$ value of 200-450 µm.

Yet an aspect of the invention, is a solid substantially amorphous active pharmaceutical ingredient (MMC-API) as herein described and claimed, having an average particle size distribution exhibiting a $d_{90}$ value of 220-440 µm.

Yet an aspect of the invention, is a solid substantially amorphous active pharmaceutical ingredient (MMC-API) as herein described and claimed, having an average particle size distribution exhibiting a $d_{90}$ value of 250-430 µm.

One aspect of the invention, is a solid substantially amorphous active pharmaceutical ingredient, comprising an API in an amount of at least 20% by weight, in admixture with a particulate anhydrous and substantially amorphous mesoporous magnesium carbonate (MMC), wherein said admixture of MMC-API (MMC-API) has:
 (i) pores with an average pore size in the range of 2 nm to 10 nm;
 (ii) an average BET surface area in the range of 150-600 m$^2$/g;
 (iii) an average pore volume in the range of 0.1-1.2 cm$^3$/g; and
 (iv) an average particle size distribution exhibiting a $d_{10}$ value of 70-200 µm; and
 (v) an average particle size distribution exhibiting a $d_{50}$ value of 100-300 µm.

Yet an aspect of the invention, is a solid substantially amorphous active pharmaceutical ingredient, comprising an API in an amount of at least 20% by weight, in admixture with a particulate anhydrous and substantially amorphous mesoporous magnesium carbonate (MMC), and wherein said admixture of MMC and API (MMC-API) has:
 (i) pores with an average pore size in the range of 2 nm to 10 nm;
 (ii) an average BET surface area in the range of 150-600 m$^2$/g;
 (iii) an average pore volume in the range of 0.1-1.2 cm$^3$/g; and
 (iv) an average particle size distribution exhibiting a $d_{10}$ value of 70-200 µm;
 (v) an average particle size distribution exhibiting a $d_{50}$ value of 100-300 µm; and
 (vi) an average particle size distribution exhibiting a $d_{90}$ value of 150-450 µm.

High substance load (i.e. API load) may often lead to crystallization, especially for substances (APIs) with high tendency to crystallize. The present inventors have shown that a particulate anhydrous and substantially amorphous mesoporous magnesium carbonate (MMC) as disclosed and claimed herein, may be useful even at high API load of an active pharmaceutical ingredient (API), to provide a substance (API) which remains XRPD amorphous as well as DSC amorphous during storage.

Yet an aspect of the invention, is a process for the manufacture of a particulate anhydrous and substantially amorphous mesoporous magnesium carbonate (MMC) as disclosed and claimed herein, comprising the steps of:
 (i) stirring magnesium oxide (MgO) and methanol under a pressure of 0.5-5 bar, or 0.5-8 bar, and at a temperature of 10-70° C., or 15-60° C., for 12-36 hours, or up to 1 week, providing a reaction mixture;
 (ii) heating the reaction mixture under a pressure of 100 mbar-1013 mbar at a temperature of −10-70° C. providing a gel;
 (iii) drying the gel of step (ii) at 50-70° C., or 70-120° C., providing particles; (iv) finally heat-treating the particles obtained in step (iii) at a temperature of 240-300° C., or 160-300° C.; and
 (v) milling and fractionation of the particles obtained in step (iv) with regard to size.

In one aspect of the invention, milling or grinding of the solid MMC material obtained in step (iv) is performed to transform said material into a particulate material, which may be performed by grinding or milling (e.g. jet milling).

In one aspect of the invention, fractionating the particles obtained in step (iv) is performed by for example wet sieving or dry sieving. Particles of the desired size are then size fractionized in order to provide a particle size distribution exhibiting a $d_{10}$ value of 70-430 µm.

Yet an aspect of the invention, is a method for the manufacture of a solid substantially amorphous active pharmaceutical ingredient (API-MMC), comprising the steps of:
 a. dissolving an API in a solvent such as an organic solvent;
 b. adding a particulate anhydrous and substantially amorphous mesoporous magnesium carbonate (MMC) as disclosed and claimed herein, to the API solution of step (a);
 c. evaporating the solvent; and
 d. optionally drying the final product.

Definitions

As used herein, the terms "poorly soluble API", "poorly soluble drug" and "insufficient drug solubility" refers to an API that requires more than 250 ml aqueous media in order to dissolve at a pH of from about 1 to about 8, based on the highest dose strength of an immediate release product, as defined for BCS II drugs.

As used herein the term "amorphous API" and "substantially amorphous API" is defined as a solid active pharmaceutical ingredient which is maintained in its amorphous form and is substantially free from crystalline material as detected by X-ray powder diffraction (XRPD) and differential scanning calorimetry (DSC). An amorphous API, or a substantially amorphous API, is thus substantially free of crystalline material and without sharp peaks in an XRPD diffractogram, and also lacks a melting point as measured by DSC.

As used herein the term "stable API" refers to an API which is physically stable and which continues to exist in a substantially amorphous form under storage conditions such as at room temperature (18-25° C.) and at a relative humidity of 25%, or at room temperature (18-25° C.) and at a relative humidity of 75%, during at least a month, or during at least 3 months, or during at least 6 months, 9 months or up to at least one year or longer. During storage under these conditions, there is no presence of crystals or substantially no presence of crystals, as detected by XRPD and by DSC.

As used herein, the term "crystalline API" is defined as an API where the structural units are arranged in fixed geometric pattern or lattices, so that crystalline solids have rigid long-range order. The structural units that constitute the crystal may be atoms, molecules or ions. Crystalline solid material shows definitive melting points and displays sharp characteristic crystalline peaks in an XRPD diffractogram (XRPD pattern).

As used herein, the wording "MMC" means a particulate anhydrous and substantially amorphous mesoporous magnesium carbonate (MMC), which may or may not contain residual magnesium oxide and/or methanol.

As used herein, the wording "MMC-API" is a solid substantially amorphous active pharmaceutical ingredient, comprising an API in an amount of at least 20% by weight, in admixture with a particulate anhydrous and substantially amorphous mesoporous magnesium carbonate (MMC) as herein claimed and described. Whenever the wording "solid substantially amorphous active pharmaceutical ingredient" and/or "MMC-API" is used throughout the present specification and claims, it means an API in admixture with a particulate and substantially amorphous mesoporous magnesium carbonate (MMC). When an API and particulate anhydrous and substantially amorphous mesoporous magnesium carbonate (MMC) of the invention is brought together as an admixture, it provides a solid substantially amorphous active pharmaceutical ingredient (MMC-API).

The wording "an API in admixture with a particulate anhydrous and substantially amorphous mesoporous magnesium carbonate (MMC)" is defined as an API starting material which has been brought into admixture with a particulate anhydrous and substantially amorphous mesoporous particulate magnesium carbonate (MMC), providing an API loaded into MMC (herein referred to as "MMC-API"), according to the present invention.

As used herein, the wording "API loaded into MMC", it means an API in admixture with MMC (i.e. a particulate anhydrous and substantially amorphous mesoporous particulate magnesium carbonate).

As used herein, the term "API load" refers to the amount of API starting material that can be included in a solid substantially amorphous active pharmaceutical ingredient as herein described and claimed (MMC-API), or as formulated into a pharmaceutical formulation (i.e. drug product).

As used herein, the wording "high API load" is defined as an amount of at least 20% by weight of an API used as starting material, which may be brought into admixture with a particulate anhydrous and substantially amorphous mesoporous magnesium carbonate (MMC) as disclosed and claimed herein, providing a solid and substantially amorphous active pharmaceutical ingredient (API) (MMC-API).

As used herein, the abbreviation "wt %" means % by weight, which is the weight fraction expressed in percent of a component in relation to the total weight of a mixture, as herein described and claimed.

As used herein, the wording "stabilizing" is defined as the use of a particulate anhydrous and substantially amorphous mesoporous magnesium carbonate (MMC) as herein described and claimed, which when brought together as an admixture with an active pharmaceutical ingredient as starting material, provides a solid substantially amorphous active pharmaceutical ingredient (MMC-API) which is maintained in amorphous form during at least 1 month storage at room temperature and 75% relative humidity.

As used herein, the wording "peak pore width" correspond to the pore width value on the x-axis extracted from the maximum (peak) value of incremental pore volume on the y-axis in a pore size distribution curve obtained from nitrogen gas adsorption.

As used herein, the wording "room temperature" or "RT" is defined as a temperature of 18-25° C.

As used herein, the term "pharmaceutical composition" refers to a pharmaceutical composition in which an active pharmaceutical ingredient has been formulated into a drug product.

As used herein, the term "drug product" is defined as a pharmaceutical composition comprising a solid substantially amorphous active pharmaceutical Ingredient (MMC-API) as herein described and claimed, together with a pharmaceutically and pharmacologically acceptable excipient, carrier and/or diluent.

As used herein, the term "active pharmaceutical agent (API)" refers to a substance which is the therapeutically active ingredient in a drug substance administered to humans and/or animals in need of medical therapy.

The API useful as starting material when making a substantially amorphous active pharmaceutical ingredient in accordance with the invention, may be an API in its free base form, acid or neutral form, or in salt form, in crystalline or polymorph form, or as a solvate.

As used herein, the term "pharmaceutically and pharmacologically acceptable excipient, carrier and/or diluent" refers to any non-therapeutic agent that may be included in a pharmaceutical composition when formulating an API to e.g. a drug product.

The terms "compressibility index" (also called "Carr index") and "Hausner ratio" are used to predict powder flowability. The term "flowability" as used herein refers to the ability of a powder to flow. Flowability is an important factor for the process of making tablets or capsules.

As used throughout the specification and claims, the term "compressibility index" (Carr index) is a measure of bulk density, size and shape, surface area, moisture content and cohesiveness both in the context of a solid substantially amorphous active pharmaceutical ingredient (MMC-API) as herein disclosed and claimed, as well as in the context of a particulate anhydrous and substantially amorphous mesoporous magnesium carbonate (MMC) as herein disclosed and claimed, and is the ratio (in percentage) between the difference in tapped density and bulk density, and the tapped density. A lower value of the Carr index means a higher flowability, and a higher Carr index means a lower flowability.

The inventors of the present invention have realized that the particle size distribution of a particulate anhydrous and substantially amorphous mesoporous magnesium carbonate (both with and without API), affects the flowability of the particles (i.e. both with and without API).

Particles that are too small may provide good release properties but may also exhibit poor flow properties, it acts as dust. On the other hand, too large particles tend to fall apart during API loading, leading to formation of small particles and a non-homogenous size distribution which in turn leads to low dose accuracy and small particles reducing the flowability.

As used throughout the specification and claims, the term "Hausner ratio" refers to the flowability of a solid substantially amorphous active pharmaceutical ingredient (MMC-API) as herein disclosed and claimed, as well as to the flowability of a particulate anhydrous and substantially amorphous mesoporous magnesium carbonate (MMC) as herein disclosed and claimed, and is the ratio between the tapped density and the bulk density. A lower Hausner value means a higher flowability, and a higher Hausner ratio means a lower flowability.

Flowability is classified according to European Pharmacopeia 9.0, and is expressed as excellent, good, fair, passable, poor, very poor, and very, very poor.

The bulk density of a powder is the ratio of the mass of an untapped powder sample and its volume including the contribution of the interparticulate void volume. Hence, the bulk density depends on both the density of powder particles and the spatial arrangement of particles in the powder bed. The bulk density is expressed in grams per milliliter (g/ml) although the international unit is kilogram per cubic meter (1 g/ml=1000 kg/m$^3$) because the measurements are made using cylinders. It may also be expressed in grams per cubic centimeter (g/cm$^3$).

By reducing the number of small particles, the flowability is improved.

As used herein, the term "average particle size distribution" exhibiting a $d_{10}$ value of 70 µm or higher, means that a maximum of 10% by volume of the particles have a particle size smaller than 70 µm.

As used herein, the term "average particle size distribution" exhibiting a $d_{10}$ value of 80 µm or higher, means that a maximum of 10% by volume of the particles have a particle size smaller than 80 µm.

As used herein, the term "average particle size distribution" exhibiting a $d_{10}$ value of 90 µm or higher, means that a maximum of 10% by volume of the particles have a particle size smaller than 90 µm or higher.

As used herein, the term "average particle size distribution" exhibiting a $d_{10}$ value of 70-430 µm, means that 10% by volume of the particles have a particle size smaller than 70-430 µm.

As used herein, the term "average particle size distribution" exhibiting a $d_{10}$ value of 70-110 µm, means that 10% by volume of the particles have a particle size smaller than 70-110 µm.

As used herein, the term "average particle size distribution" exhibiting a $d_{10}$ value of 30-170 µm, means that 10% by volume of the particles have a particle size smaller than 30-170 µm.

As used herein, the term "average particle size distribution" exhibiting a $d_{10}$ value of 20-40 µm, means that 10% by volume of the particles have a particle size smaller than 20-40 µm.

As used herein, the term "average particle size distribution" exhibiting a $d_{50}$ value of 75-500 µm, means that 50% by volume of the particles have a particle size of 75-500 µm.

As used herein, the term "average particle size distribution" exhibiting a $d_{50}$ value of 75-250 µm, means that 50% by volume of the particles have a particle size of 75-250 µm.

As used herein, the term "average particle size distribution" exhibiting a $d_{50}$ value of 100-250 µm, means that 50% by volume of the particles have a particle size of 100-250 µm.

As used herein, the term "average particle size distribution" exhibiting a $d_{50}$ value of 150-250 µm, means that 50% by volume of the particles have a particle size of 150-250 µm.

As used herein, the term "average particle size distribution" exhibiting a $d_{50}$ value of 170-210 µm, means that 50% by volume of the particles have a particle size of 170-210 µm.

As used herein, the term "average particle size distribution" exhibiting a $d_{50}$ value of 95-125 µm, means that 50% by volume of the particles have a particle size of 95-125 µm.

As used herein, the term "average particle size distribution" exhibiting a $d_{50}$ value of 140-230 µm, means that 50% by volume of the particles have a particle size of 140-230 µm.

As used herein, the term "average particle size distribution" exhibiting a $d_{50}$ value of 95-130 µm, means that 50% by volume of the particles have a particle size of 95-130 µm.

As used herein, the term "average particle size distribution" exhibiting a $d_{90}$ value of 260-350 µm, means that 90% by volume of the particles have a particle size smaller than 260-350 µm.

As used herein, the term "average particle size distribution" exhibiting a $d_{90}$ value of 280-350 µm, means that 90% by volume of the particles have a particle size smaller than 280-350 µm.

As used herein, the term "average particle size distribution" exhibiting a $d_{90}$ value of 305-350 µm, means that 90% by volume of the particles have a particle size smaller than 305-350 µm.

As used herein, the term "average particle size distribution" exhibiting a $d_{90}$ value of 180-360 µm, means that 90% by volume of the particles have a particle size smaller than 180-360 µm.

As used herein, the term "average particle size distribution" exhibiting a $d_{10}$ value of 70-200 µm, means that 10% by volume of the particles have a particle size smaller than 70-200 µm.

As used herein, the term "average particle size distribution" exhibiting a $d_{10}$ value of 80-180 µm, means that 10% by volume of the particles have a particle size smaller than 80-180 µm.

As used herein, the term "average particle size distribution" exhibiting a $d_{10}$ value of 90-170 µm, means that 10% by volume of the particles have a particle size smaller than 90-170 µm.

As used herein, the term "average particle size distribution" exhibiting a $d_{50}$ value of 100-300 µm, means that 50% by volume of the particles have a particle size of 100-300 µm.

As used herein, the term "average particle size distribution" exhibiting a $d_{50}$ value of 130-300 µm, means that 50% by volume of the particles have a particle size of 130-300 µm.

As used herein, the term "average particle size distribution" exhibiting a $d_{50}$ value of 150-290 μm, means that 50% by volume of the particles have a particle size of 150-290 μm.

As used herein, the term "average particle size distribution" exhibiting a $d_{50}$ value of 160-280 μm, means that 50% by volume of the particles have a particle size of 160-280 μm.

As used herein, the term "average particle size distribution" exhibiting a $d_{90}$ value of 150-450 μm, means that 90% by volume of the particles have a particle size smaller than 150-450 μm.

As used herein, the term "average particle size distribution" exhibiting a $d_{90}$ value of 200-450 μm, means that 90% by volume of the particles have a particle size smaller than 200-450 μm.

As used herein, the term "average particle size distribution" exhibiting a $d_{90}$ value of 220-440 μm, means that 90% by volume of the particles have a particle size smaller than 220-440 μm.

As used herein, the term "average particle size distribution" exhibiting a $d_{90}$ value of 250-430 μm, means that 90% by volume of the particles have a particle size smaller than 250-430 μm.

A particulate anhydrous and substantially amorphous mesoporous material of magnesium carbonate (MMC) as herein disclosed and claimed, consists of many particles where there may be a variability in technical parameters such as pore size, BET surface area, pore volume, and particle size distribution between particles.

Whenever the term "average" is used, such as but not limited to, the terms "average pore size", "average BET surface area", "average pore volume" and "average particle size", it thus refers to the average pore size, average BET surface area, average pore volume, and average particle size for a particular particle of mesoporous magnesium carbonate (MMC) and/or MMC-API.

The term "about" as used throughout the present specification and claims, is used to indicate a deviation of +/−2% of the given value, or +/−5%, or +/−10% of the numeric values, where applicable.

In one aspect of the invention, a particulate anhydrous and substantially amorphous mesoporous material of magnesium carbonate (MMC) is amorphous as measured by X-ray powder diffraction (XRPD amorphous).

In still an aspect of the invention, a particulate anhydrous and substantially amorphous mesoporous material of magnesium carbonate (MMC) according to the present invention, is amorphous as measured by differential scanning calorimetry (DSC amorphous).

In yet an aspect of the invention, a particulate anhydrous and substantially amorphous mesoporous material of magnesium carbonate (MMC) according to the present invention is both XRPD amorphous and DSC amorphous.

In yet an aspect of the invention, a particulate anhydrous and substantially amorphous mesoporous material is a particulate composite material of X-ray amorphous and DSC amorphous mesoporous magnesium carbonate (MMC) and magnesium oxide (MgO).

In one aspect of the invention, the magnesium oxide (MgO) is a residue from the process for making a particulate anhydrous and a substantially amorphous mesoporous material as herein described and claimed.

GENERAL METHODS FOR PREPARATION

Figure 1:
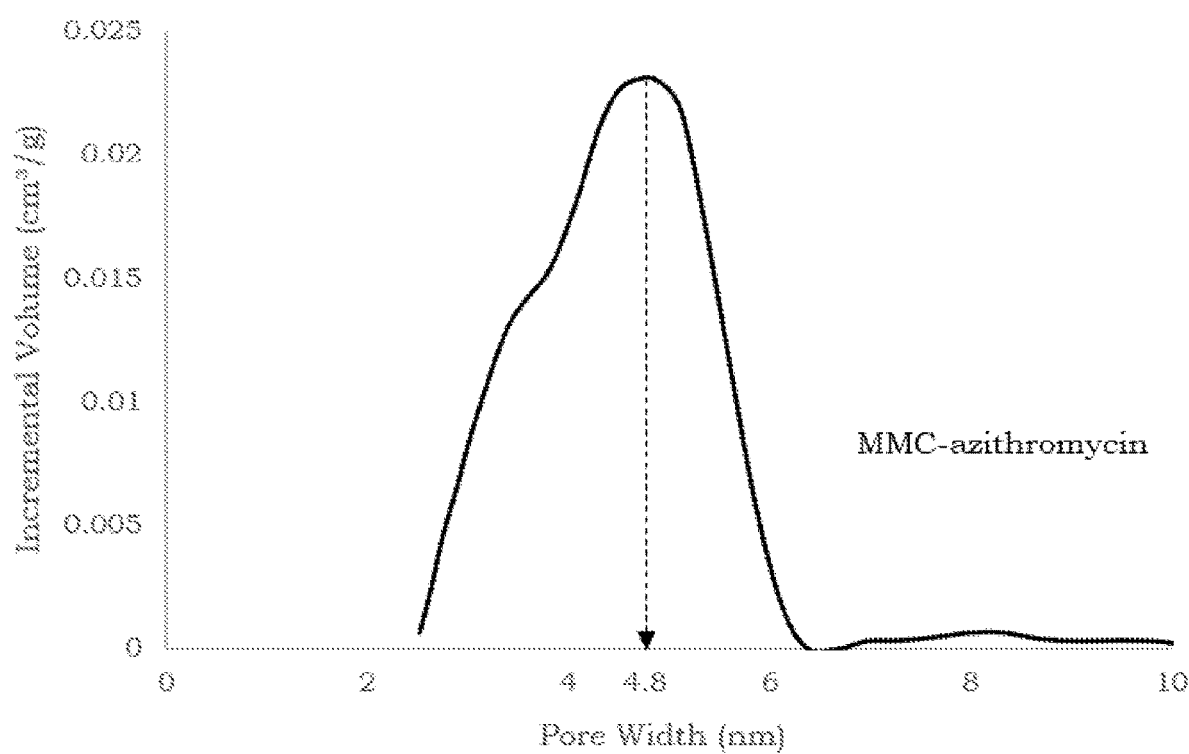
FIG. 1 (Example 2) illustrates the peak pore width of azithromycin loaded into MMC (referred to as MMC-azithromycin).

I. General Method for the Preparation of Particulate Anhydrous Mesoporous Magnesium Carbonate (MMC)

A particulate anhydrous and substantially amorphous mesoporous magnesium carbonate (MMC) as disclosed and claimed herein, may be prepared by a process comprising the steps of:
  (i) stirring magnesium oxide (MgO) and methanol under a pressure of 0.5-8 bar, and at a temperature of 15-60° C. for 12 hours-1 week in a pressure reactor, providing a reaction mixture;
  (ii) heating the reaction mixture under a pressure of 100 mbar-1013 mbar, and at a temperature of −10-70° C. providing a gel;
  (iii) drying the gel of step (ii) at 70-120° C., providing particles;
  (iv) finally heat-treating the particles obtained in step (iii) at a temperature of up to 300° C.; and
  (v) optionally milling and fractionating the particles obtained in step (iv) with regard to size.

The stirring in step (i) may be performed at a rotation speed of 50-500 rpm, and the ratio MgO [g]/Methanol [ml] may be 1:12.5, i.e. 1.0 g MgO/12.5 ml methanol.

The final optional heat-treatment (iv) of the particles may be performed by using a furnace with normal atmosphere. The temperature may be ramped from room temperature and up to 300° C. for 5-15 hours, and the temperature may thereafter be fixed at the elevated temperature for up to 24 hours.

The obtained material is a solid material or a cake which is then crushed into a particulate material. This may be done by grinding or milling (e.g. jet milling). Particles of the desired size are then size fractionized in order to provide a particle size distribution exhibiting a $d_{10}$ value of 70-430 µm.

The fractionation step (v) with regard to size, may be performed by dry sieving or by wet sieving. The particle size may also be controlled during the synthesis by using different types of reactors, raw material, or different methods for heat treatment.

Material Characterization

Pore size is determined using nitrogen gas adsorption. Measurements are made on a Gemini VII 2390 or a Tristar® II Plus 3030 surface area and porosity analyzer (Micromeritics, Norcross, GA, USA) operated at 77.3 K, providing data to be used for determining pore size, pore volume and BET surface area of MMC and MMC loaded with API (MMC-API), respectively). Prior to analysis, 100-200 mg sample is added to a sample tube and degassed without or under vacuum for at least 12 hours at 105° C. Pore size distributions are obtained using density functional theory (DFT) applied to the adsorption branch of nitrogen sorption isotherms. The surface area is determined by using well-recognized BET equation, and hence calculated from the nitrogen sorption isotherms (Brunauer et al, JACS, 60, 1938, 309-319).

It is to be noted that the BET surface area, measured by nitrogen adsorption analysis as herein described, may be higher if measured on an MMC which has not undergone heat treatment as herein described. Heat treating the MMC, i.e. exposing the MMC to elevated temperatures for a prolonged time, such as above 200° C. for over 10 hours in an oven, reduces the residual methanol content to typically below 4% by weight. Residual methanol is mostly dispersed inside the pores of the MMC which, depending on the amount by weight, may impact measurements of BET surface area by nitrogen adsorption analysis. The BET surface area of MMC which has not been heat treated may thus vary from 400-900 m$^2$/g (such as 450-900 m$^2$/g or 500-850 m$^2$/g). The BET surface area as measured in accordance with the present invention, is measured on heat treated MMC.

Powder XRPD patterns are obtained on a Bruker D8 Advance Twin-Twin diffractometer (Bruker UK Ltd., Coventry, UK) with Cu-K$_\alpha$ radiation ($\lambda$=1.54 Å), generating XRPD patterns through elastic X-ray scattering. Prior to the analysis, samples are ground, dispersed with ethanol and applied as a thin layer upon a zero-background silicon sample holder. Any residual solvent is evaporated under a heat lamp prior to analysis. The analysis setup may be in the 2θ range 20-80 degrees, 5-80 degrees or 5-65 degrees.

Presence or non-presence of crystals as detected by DSC is determined by equilibrating a weighed sample holder in a DSC (Differential Scanning Calorimetry) sample holder at a suitable temperature. The temperature is ramped at 10° C./min to a suitable temperature at which the sample is kept isothermally for 5 minutes before ramping the temperature down to the equilibration temperature. Finally, the temperature is ramped to well above the melting point of the sample. The equilibration temperature may be −35° C. and the isothermal temperature may be 80° C.

The particle size distributions are measured using laser diffraction with the Malvern Mastersizer 3000, using a dry method. The light scattering data, converted to particle size distribution are analyzed using Mie-scattering model, using the non-spherical particle type and MMC (MgCO$_3$) as material (i.e. MgCO$_3$ settings for the refractive index, adsorption index and density). Prior to adding the sample to the instrument, the sample container is mixed well in order to ensure good sampling. A few grams of powder is added to instrument for the measurement, the measurement time is set to 10-30 seconds. The lower obstruction limit is set to 0.5% and the upper limit to 5%, the air pressure is set to 1.5 barg. During the measurement the feed rate is constantly adjusted so that the obstruction is kept between 0.5% and 5%. All measurements are run in at least triplicate, from which an average result is calculated.

The particle size distribution of an MMC-API, or MMC, may also be measured using a wet method by laser diffraction with the Malvern Mastersizer 3000 with a Hydro MV accessory. The light scattering data, converted to particle size distribution are analyzed using Mie-scattering model, using the non-spherical particle type. The refractive index was set to 1.72 and absorption 0.01. In the software the dispersant is set as water with a refractive index of 1.33 and a level sensor threshold of 100. Maximum pump speed (3500 rpm) is used to prevent sedimentation of dispersed MMC-API, or MMC. All of the measurements including MMC-API, or MMC, are done in 10 mM NaOH. A background is taken with the cell filled with 10 mM NaOH and 3500 rpm pumping. A typical analysis includes 20 mg of MMC-API, or MMC, dispersed in 2.5 ml 10 mM sodium hydroxide in a 5 ml glass vial by 2 minutes of bath sonication. After sonication the MMC-API, or MMC, the sample is transferred to the measurement cell. The vial is rinsed several times to make sure all of the particular material has been transferred. Measurement duration is 10 seconds background and 10 seconds sample. Six sub runs are made, upon which an average result is calculated.

Investigation of Powder Flowability

Tapped Density and Bulk Density Measurement

A mechanically tapping device (Pharma Test PT-TD, Hainburg, Germany) is used to evaluate the powder's propensity to dense packing. A glass cylinder with a diameter of 12 mm (n=3) is filled with 10 ml of powder and weighed to obtain the initial bulk density, ρBulk. Thereafter, the cylinder is mechanically tapped with a constant velocity until the most stable arrangement is achieved and the volume does no longer decrease. A comparison between the ρBulk, and the final bulk density, ρtapped, is made. By measuring the untapped apparent volume, $V_0$, and the final tapped apparent volume, $V_f$, the compressibility index and Hausner ratio is calculated using equation 1 and 2. They are used as a measurement of the powder's flowability (European Pharmacopeia 9.0).

$$\text{Compressibility Index (\%)} = 100 \times (V_0 - V_f/V_0) \quad \text{Equation 1}$$

$$\text{Hausner ratio} = V_0/V_f \quad \text{Equation 2}$$

II. Preparation of a Solid Substantially Amorphous API (MMC-API)

A solid substantially amorphous active pharmaceutical ingredient, comprising an API in admixture with particulate anhydrous and substantially amorphous mesoporous magnesium carbonate (MMC), may be prepared by
  a. dissolving an API in a solvent such as an organic solvent;
  b. adding a particulate anhydrous and substantially amorphous mesoporous magnesium carbonate (MMC) as herein disclosed and claimed, to the API solution of step (a);
  c. evaporating the solvent; and
  d. optionally drying the final product.

The API starting materials fenofibrate, ibuprofen, ketoprofen, prednisolone, ritonavir, telmisartan were purchased from Sigma-Aldrich. The API starting materials gefitinib, paclitaxel, sulfamethoxazole, tolfenamic acid as well as afatinib, bosutinib, crizotinib, dapagliflozin, gefitinib, ibrutinib, lesinurad, luliconazole, macitentan, nintedanib, osimertinib, panabinostat, posaconazole, regorafenib, rilpivirine, riociguat, rivaroxaban, selexipag, sorafenib and vilazodone were purchased from Chemtronica.

The ratio API [g]/anhydrous and particulate substantially amorphous mesoporous magnesium carbonate (MMC) [g] depends on the target API load: e.g. 3/7 for 30 wt % API load, or 1/1 for 50 wt % API load.

Examples of solvents useful in dissolving the API in step a) are lower alcohols such as methanol or ethanol, and acetone or mixtures thereof. Also 1-butanol, 2-butanol, acidified ethanol (0.1% 1M HCl), butyl acetate, tert-butylmethyl ether, dichloromethane, dimethyl sulfoxide, ethyl acetate, ethyl ether, ethyl formate, formic acid, heptane, isobutyl acetate, isopropyl acetate, methyl acetate, 3-methyl-1-butanol, methylethyl ketone, 2-methyl-1-propanol, pentane, 1-pentanol, 1-propanol, 2-propanol, propyl acetate, and triethylamine may be useful in dissolving an API.

Evaporation of the solvent in step c) may be performed at a reduced pressure, and at a temperature of room temperature and up to 70° C., such as 50-70° C. The optional drying in step d) may be performed at a temperature of 70-100° C.

A high API load may be useful to reduce the amount of mesoporous material and in order to reduce the size of a capsule or tablet when formulating the amorphous API into a drug product, but the amount of API cannot be too high due to the risk of crystallization.

The inventors of the present invention have developed a novel particulate anhydrous and substantially amorphous mesoporous magnesium carbonate (MMC), and a new technology providing for a stable amorphous active pharmaceutical ingredient (MMC-API).

To obtain the substantially amorphous active pharmaceutical ingredient according to the present invention (MMC-API), the particulate anhydrous and substantially amorphous mesoporous magnesium carbonate (MMC) obtained after sieving, is mixed with a solution of an API in a container, such as an evaporation flask or round flask, or in a reactor, such as a glass/glass lined/stainless steel/Hastelloy reactor. The loading step is dependent on the properties of the active pharmaceutically ingredient. Mixing may be done by stirring, swirling or shaking and may be done at room temperature (18-25° C.). The mixing may be done for 20-120 minutes or 30-60 minutes after which the solvent is evaporated at reduced pressure. The evaporation is done during stirring, shaking or during rotation of the container. The reduced pressure may be 900 mbar or lower, such as 500 mbar or lower, or 200 mbar or lower, or 100 mbar or lower. The complete loading step, or at least the evaporation of the solvent, may be performed in a rotary evaporator. The MMC-API (i.e. MMC loaded with API) is isolated and optionally dried for example at 60-80° C., e.g. around 70° C.

The solid substantially amorphous active pharmaceutical ingredient (MMC-API) according to the present invention, may also be obtained by first preparing a solution of the API in a suitable solvent followed by wet impregnation onto the MMC, by spray-drying the dissolved API together with the dispersed MMC particles, by spraying the API onto MMC material suspended by a gas-stream (fluid-bed setup), by low- or high-shear wet granulation whereby the dissolved API may be applied by spraying, or by any other pharmaceutical process method.

If the admixture of MMC and API (i.e. the substantially amorphous active pharmaceutical ingredient according to the present invention, the MMC-API) is prepared on MMC which has not been heat treated, i.e. an MMC having a residual methanol content typically above 7 wt %, it is to be noted that the BET surface area may be higher on such MMC-API. The BET surface area of an MMC-API prepared on an MMC that has not been heat treated may in such case thus vary from 300-600 $m^2/g$ (such as 310-550 $m^2/g$ or 320-500 $m^2/g$). The BET surface area as described and claimed in accordance with the present invention, is measured on MMC-API which has been prepared on MMC that was heat treated prior to API loading into the MMC material.

Stability Testing

A solid substantially amorphous active pharmaceutical ingredient as disclosed and claimed herein (MMC-API), is stored at room temperature in a desiccator containing a saturated NaCl mixture so that the relative humidity is substantially 75%. The stability of the amorphous form is measured using XRPD and DSC at different time points such as 1 month, 1 year or longer.

Powder XRPD patterns are obtained on a Bruker D8 Advance Twin-Twin diffractometer (Bruker UK Ltd., Coventry, UK) with Cu-$K_\alpha$ radiation ($\lambda$=1.54 Å), generating XRPD patterns through elastic X-ray scattering. Prior to the analysis, samples may be ground, dispersed with ethanol and applied as a thin layer upon a zero-background silicon sample holder, or as a dry powder. Any remaining solvent is evaporated, such as under a heat lamp or infrared light, prior to the analysis. The analysis setup may be in the 2θ range 20-80 degrees, 5-80 degrees or 5-65 degrees.

DSC analysis is determined by equilibrating a weighed sample in a DSC (Differential Scanning Calorimetry) sample holder at a suitable temperature. The temperature is ramped at 10° C./min to a suitable temperature at which the sample is kept isothermally for 5 minutes before ramping the temperature down to the equilibration temperature. Finally, the temperature is ramped to a temperature well above the melting point of the API. The equilibration temperature may be −35° C. and the isothermal temperature may be 80° C.

To assess the chemical integrity of the APIs and excipients, in case excipients are used, a High Performance Liquid Chromatography (HPLC) system, with the appropriate software and equipped with suitable pump, auto-sampler, column, column oven and UV-VIS detector may be used. The analytical column used for the separation is selected considering the type of system that is used and the chemical entity that is analyzed. A typical analysis is performed, but not limited to, under constant column temperature of 25±2° C. and the separation is typically, but not limited to, carried out in isocratic mode with mobile phase constituting acetonitrile. Prior to use, the mobile phase may be filtered using millipore 0.45 μm filter and degassed on an ultrasonic bath. After optimization, the ideal flow rate is identified and samples of suitable volume and concentration is injected into the HPLC system to initiate the analysis. The analytical goal is to identify the parent chemical entity and/or the absence or presence of any chemical degradation products.

Pharmaceutical Formulations

A solid substantially amorphous active pharmaceutical ingredient as herein described and claimed (MMC-API), may be formulated as an oral pharmaceutical formulation in admixture with a pharmaceutically and pharmacologically acceptable excipient, carrier and/or diluent. Examples of a useful oral pharmaceutical formulation (a drug product) may be selected from any one of a tablet, a powder, a capsule, with solid substantially amorphous API, a granule or a cachet, each containing a predetermined amount of an amorphous API as herein described and claimed.

Examples of pharmaceutically acceptable excipients, carriers and/or diluents useful when formulating a solid substantially amorphous active pharmaceutical ingredient as herein described and claimed (MMC-API), are thickeners, flavoring agents, diluents, emulsifiers, dispersing aids, carrier substances, lubricants or binders. Typical pharmaceutical carriers include, but are not limited to, binding agents (e.g. pregelatinized maize starch, polyvinylpyrrolidone or hydroxypropyl methylcellulose, etc.); fillers (e.g. lactose, glucose, sucrose and other sugars, microcrystalline cellulose, pectin, gelatin, calcium sulfate, ethyl cellulose, polyacrylates or calcium hydrogen phosphate, etc.); lubricants (e.g. magnesium stearate, talc, silica, colloidal silicon dioxide, stearic acid, metallic stearates, hydrogenated vegetable oils, corn starch, polyethylene glycols, sodium benzoate, sodium acetate, etc.); disintegrants (e.g. starch, and sodium starch glycolate); wetting agents; diluents; coloring agents; emulsifying agents; pH buffering agents; preservatives; and mixtures thereof.

A substantially amorphous active pharmaceutical ingredient as disclosed and claimed herein (MMC-API), may be formulated into tablets, powder, capsules or cachet, using any suitable formulation technique known to a skilled person. Alternatively, the substantially amorphous active pharmaceutical ingredient (MMC-API) may be filled into a capsule, such as a hard gelatin capsule or a soft gelatin capsule.

Medical Use

One aspect of the present invention is the use of a solid substantially amorphous active pharmaceutical ingredient (MMC-API), as herein disclosed and claimed, in therapy.

Yet an aspect of the invention is a solid substantially amorphous active pharmaceutical ingredient as herein disclosed and claimed (MMC-API), for the treatment of cancer such as breast cancer, prostate cancer, lung cancer or any disease that can be treated with antineoplastic agents; infections such as a bacterial infection; HIV infections; cardiovascular diseases such as hypertension; pain; migraine; inflammation; asthma; allergic reactions; diabetes such as type 2 diabetes; nausea; thrombocytopenia; hyperuricemia; fungal infections; pulmonary arterial hypertension; depression; thrombosis; or rheumatoid arthritis.

Yet an aspect of the invention, is the use of a solid substantially amorphous active pharmaceutical ingredient as herein disclosed and claimed (MMC-API), for the manufacture of a medicament for the treatment of cancer such as breast cancer, prostate cancer, lung cancer or any disease that can be treated with antineoplastic agents; infections such as a bacterial infection; HIV infections; cardiovascular diseases such as hypertension; pain; migraine; inflammation; asthma; allergic reactions; diabetes such as type 2 diabetes; nausea; thrombocytopenia; hyperuricemia; fungal infections; pulmonary arterial hypertension; depression; thrombosis; or rheumatoid arthritis.

Yet an aspect of the invention, is a method for the treatment of cancer such as breast cancer, prostate cancer, lung cancer or any disease that can be treated with antineoplastic agents; infections such as a bacterial infection; HIV infections; cardiovascular diseases such as hypertension; pain; migraine; inflammation; asthma; allergic reactions; diabetes such as type 2 diabetes; nausea; thrombocytopenia; hyperuricemia; fungal infections; pulmonary arterial hypertension; depression; thrombosis; or rheumatoid arthritis; whereby a solid substantially amorphous active pharmaceutical ingredient as herein disclosed and claimed (MMC-API), is administered to a subject in need of such treatment.

The use or treatment of the medical indications disclosed herein, may be monotherapy, or combination therapy.

EXAMPLES

Example 1—Preparation and Flowability of Particulate Anhydrous and Substantially Amorphous Mesoporous Magnesium Carbonate (MMC)

Particulate anhydrous and substantially amorphous mesoporous magnesium carbonate was prepared by:
(i) stirring 160 g magnesium oxide (MgO) (Magnesia 295 purchased from Brenntag Nordic AB Taby, Sweden) and 2 L of methanol (purchased from Solveco AB, Rosersberg, Sweden) in a stainless steel pressure reactor;
(ii) applying 4 bar $CO_2$ pressure and stirring (500 rpm) the solution from (i) at room temperature for 8 days;
(iii) transferring the reaction liquid formed in (ii) to an evaporation flask connected to a rotary evaporator;
(iv) heating the reaction liquid at 60-80° C., at 950 mbar and at 60 rpm using the rotary evaporator for 4 hours, providing a gel;
(v) drying the gel at 80-100° C., at 950 mbar and at 60 rpm using the rotary evaporator for 1 hour, forming particles;
(vi) finally heat treating the particles of step (v) at a temperature of 250° C. in normal atmosphere using a furnace. The temperature was ramped from room temperature to 250° C. in steps so that:
it increased from room temperature to 80° C. during 1 hour and 15 minutes;
it increased from 80° C. to 120° C. during 2 hours;
it increased from 120° C. to 150° C. during 2 hours;
it increased from 150° C. to 250° C. during 2 hours. The furnace was turned after a total of 14 hours and the powder was left to cool in the furnace;
(vii) the obtained anhydrous and substantially amorphous mesoporous particulate magnesium carbonate was ground with a mortar and pestle and sieved (dry) (30 minutes, amplitude 100%) using a Vibratory Sieve Shaker AS 200 basic (Retsch GmbH, Haan, Germany) and sieves with mesh sizes: 710 μm, 500 μm, 250 μm, 150 μm, 100 μm, 75 μm and 50 μm.

Nitrogen gas adsorption analysis, XRPD and investigation of powder flowability, including tapped density and bulk density measurement, on the obtained MMC are performed as described elsewhere herein.

Results

A set of six different fractions were obtained with mean particle sizes ($D_{50}$) of 630.0 μm, 203.4 μm, 112.1 μm, 60.3 μm, 45.8 μm and 24.0 μm respectively.

The obtained particulate anhydrous and substantially amorphous mesoporous magnesium carbonate (MMC) had a BET surface area of 378 m²/g and a pore volume of 0.71 cm³/g with ~100% of the pore volume from pores <10 nm in diameter.

The bulk and tapped density for the different size fractions are shown in Table 1. By using the obtained values, the Carr index and Hausner ratio were calculated for the respective size fractions and the flow property classified according to European Pharmacopeia 9.0, fraction 1 and 2 were classified as excellent, fraction 3 as good, fraction 4 and 5 as poor and fraction 6 as very, very poor. The results are summarized in Table 1 below.

TABLE 1

Flowability properties of the six different fractions obtained in Example 1 of particulate anhydrous and substantially amorphous mesoporous magnesium carbonate (abbreviated MMC in the table below). Values are given as mean and (s.d).

| MMC | $D_{10}$ [μm] | $D_{50}$ [μm] | $D_{90}$ [μm] | Bulk density [g/ml] | Tapped density [g/ml] | Carr index | Hausner ratio | Flow property* |
|---|---|---|---|---|---|---|---|---|
| 1 | 354.6 (4.4) | 630.0 (25.2) | 1048.2 (105.1) | 0.42 (0.003) | 0.43 (0.003) | 3 (0) | 1.03 (0) | Excellent |
| 2 | 90.7 (2.0) | 203.4 (2.7) | 344.0 (5.1) | 0.47 (0.002) | 0.52 (0.003) | 9 (0.8) | 1.09 (0.01) | Excellent |
| 3 | 17.8 (0.5) | 112.1 (1.5) | 201.2 (5.4) | 0.46 (0.007) | 0.54 (0.016) | 15 (1.5) | 1.18 (0.02) | Good |
| 4 | 7.5 (0.1) | 60.3 (0.6) | 126.8 (2.8) | 0.42 (0.004) | 0.59 (0.008) | 29 (1.1) | 1.40 (0.02) | Poor |
| 5 | 6.9 (0.1) | 45.8 (0.3) | 92.9 (0.8) | 0.40 (0.01) | 0.57 (0.006) | 30 (1.2) | 1.42 (0.02) | Poor |
| 6 | 4.1 (0.0) | 24.0 (0.3) | 54.1 (0.6) | 0.33 (0.005) | 0.58 (0.003) | 43 (1.2) | 1.74 (0.04) | Very, very poor |

*According to European Pharmacopeia 9.0 (2016), Chapter 2.9.36. Powder Flow

Example 2—Preparation and Stability of an MMC-API

Three batches of particulate anhydrous and substantially amorphous mesoporous magnesium carbonate (MMC) were prepared and analyzed as previously described, with the exception that only mesh sizes 100 and 250 μm were used for sieving. The particulate mesoporous MMC material used had an average BET surface area in the range of about 340-590 m²/g, an average pore volume in the range of about 0.56-1.05 cm³/g with about 100% of the pore volume from pores <10 nm in diameter. The magnesium oxide (MgO) used was purchased from Lehmann&Voss&Co.

MMC material loaded with API, i.e. the admixture of MMC and API (MMC-API), exhibited an average BET surface area of 100-286 m²/g, a total pore volume of 0.17-0.8 cm³/g, depending on type and amount of API, and the peak pore diameter was reduced with ~1 nm as compared to the unloaded material.

Each API starting material, i.e. azithromycin, fenofibrate, gefitinib, ibuprofen, ketoprofen, lopinavir, paclitaxel, prednisolone, ritonavir, sulfamethoxazole, telmisartan and tolfenamic acid respectively, was dissolved in ethanol (pH 6-10) and the mesoporous particles (MMC) were added to the solution. The target API load was 30 wt % and/or 50 wt %. The mesoporous particles were mixed with the API solution at room temperature using a magnetic stirrer for 20-60 minutes. After mixing, the ethanol was removed at reduced pressure (500-100 mbar) and at 60° C. using a rotary evaporator (Büchi Rotavapor® R-200 or Rotavapor® R-300 with Heating Bath B-305, Heating Bath B-300 Base, Vacuum pump V-300 and Interface I-300 or Interface 1-300 Pro, B-Ochi, Flawil, Switzerland). The obtained solid substantially amorphous API was finally dried in an oven at 70° C. All API starting materials were used in their respective free form, except for gefitinib which was used as the hydrochloride salt.

The obtained solid substantially amorphous active pharmaceutical ingredients (MMC-APIs) were analyzed by nitrogen gas adsorption to determine pore size, pore volume and BET surface area. XRPD and DSC were performed in order to determine if the API was present in its amorphous state.

Nitrogen gas adsorption was performed on a Gemini VII 2390 or a Tristar® II Plus 3030 surface area and porosity analyzer (Micromeritics, Norcross, GA, USA) operated at 77.3 K. 100-200 mg MMC-API was added to a sample tube and degassed for at least 12 hours at 105° C. prior to analysis.

XRPD was measured using a Bruker D8 TwinTwin X-ray Diffractometer (Bruker UK Ltd., Coventry, UK) with Cu-K$_\alpha$ radiation ($\lambda$=1.54 Å). Ethanol was added to the samples to make a suspension that was applied onto a silicon zero background sample holder. The solvent was evaporated under light prior to the analysis. The analysis set-up was in the 2θ range: 20-80 degrees, 5-80 degrees or 5-65 degrees.

DSC analysis was performed by adding 2-3 mg of sample to an aluminum pan, onto which an aluminum lid is placed and firmly closed using a crimper. To allow moisture from the sample to evaporate during the analysis, a pinhole is made in the middle of the pan using a needle.

The DSC analysis was run accordingly:

Cycle 1:
  Equilibration at −35° C.
Cycle 2:
  Ramp 10° C./min to 80.00° C.
  Isothermal for 5 minutes.
  Ramp 10° C./min to −35° C.
Cycle 3:
  Ramp 10° C./min to well above melting temperature for each respective API.

The solid substantially amorphous API samples (i.e. MMC-APIs) azithromycin, fenofibrate, ibuprofen, ketoprofen, lopinavir, prednisolone, ritonavir 30 wt %, sulfamethoxazole, telmisartan 30 wt % and tolfenamic acid 30 and 50 wt %, were stored at room temperature in a desiccator containing a saturated NaCl solution, resulting in a 75% relative humidity atmosphere. After 1 month of storage and after 1 year of storage, the samples were analyzed with XRPD and DSC, as described above, to determine whether they were still amorphous or if they had crystallized.

Results According to Example 2

All APIs were loaded into the particulate anhydrous and substantially amorphous mesoporous magnesium carbonate, to provide MMC-API, as can be seen by the change in pore volume, BET surface area and pore size. Results from nitrogen gas adsorption are presented in Table 2a below.

TABLE 2a

Pore volume, BET surface area and peak pore width, after loading API into particulate anhydrous and substantially amorphous magnesium carbonate (MMC), providing MMC-API. The peak pore width of azithromycin loaded into MMC (referred to as MMC-azithromycin), is also shown in FIG. 1.

| API in the MMC-API admixture | API load [wt %] | Pore Volume at $p/p_0$ 0.97 [cm$^3$/g] | BET Surface Area [m$^2$/g] | Peak Pore Width [nm] |
|---|---|---|---|---|
| Azithromycin | 30 | 0.32 | 228 | 4.8 |
| Fenofibrate | 30 | 0.39 | 306 | 4.1 |
| Gefitinib | 30 | 0.46 | 246 | 5.0 |
| Ibuprofen | 50 | 0.08 | 84 | 4.47 |
| Ketoprofen | 50 | 0.05 | 60 | 4.0 |
| Lopinavir | 50 | 0.10 | 74 | 4.3 |
| Prednisolone | 30 | 0.41 | 312 | 4.5 |
| Ritonavir (1) | 30 | 0.22 | 123 | 5.1 |
| Ritonavir (2) | 50 | 0.03 | 42 | 4.0 |
| Sulfamethoxazole | 30 | 0.48 | 261 | 4.6 |
| Telmisartan | 50 | 0.09 | 47 | 6.9 |
| Tolfenamic acid (1) | 30 | 0.28 | 243 | 4.2 |
| Tolfenamic acid (2) | 50 | 0.10 | 77 | 4.9 |

Figure 2:
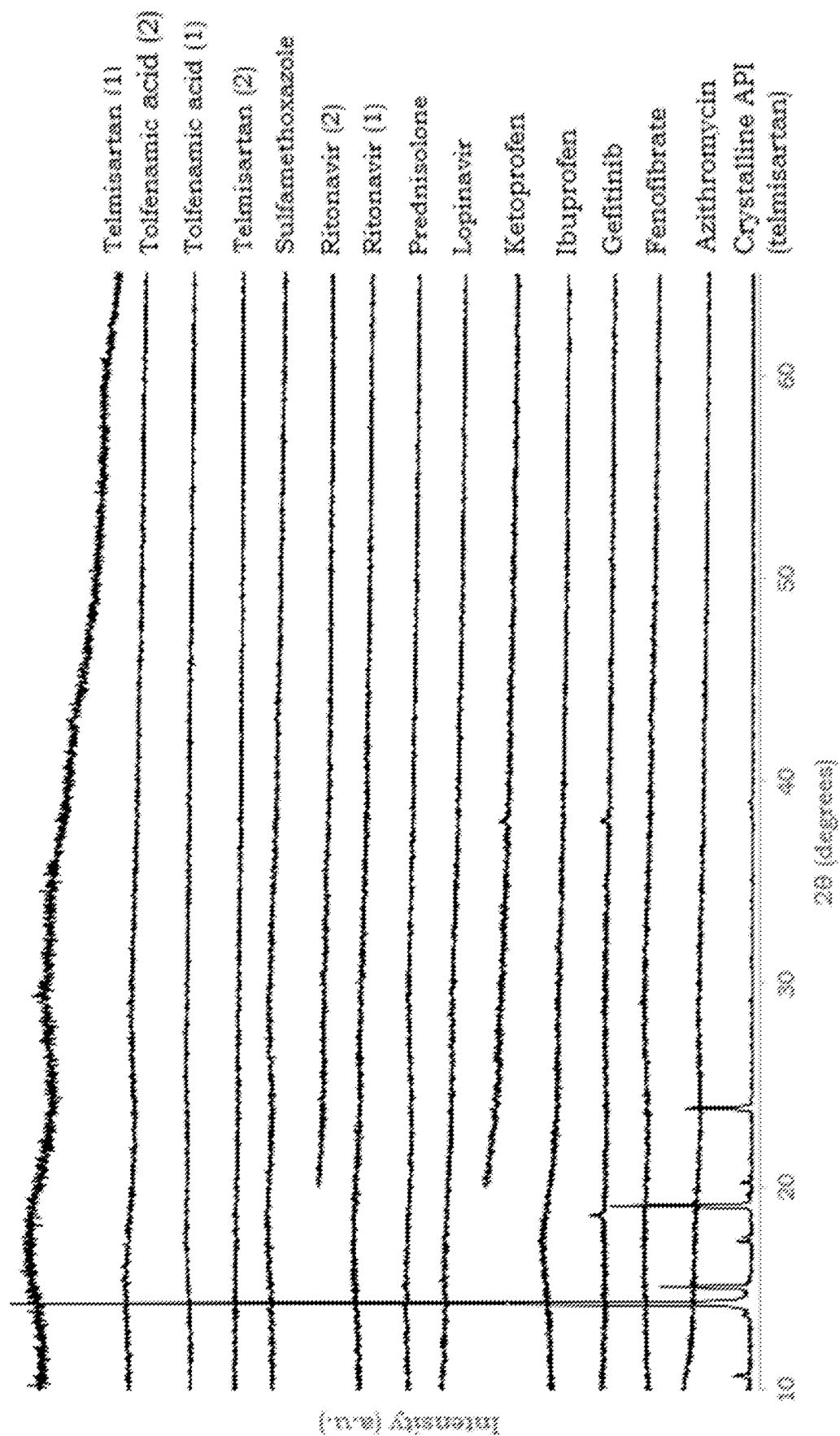
FIG. 2 (Example 2) shows an X-ray powder diffractogram (XRPD) of solid substantially amorphous API, after loading of an API into particulate anhydrous and substantially amorphous mesoporous magnesium carbonate (MMC), i.e. MMC-API. The 2θ range in this figure was limited to 10-65 degrees. Crystalline API (telmisartan) was measured as a reference.

The respective APIs loaded into MMC were amorphous according to XRPD and DSC, as shown in Table 2b and FIG. 2.

TABLE 2b

Physical state of APIs after loading into particulate anhydrous and substantially amorphous magnesium carbonate (MMC), providing MMC-API.

| API in the MMC-API admixture | API load [wt %] | XRPD amorphous after loading | DSC amorphous after loading |
|---|---|---|---|
| Azithromycin | 30 | Yes | Yes |
| Fenofibrate | 30 | Yes | Yes |
| Gefitinib | 30 | Yes | Yes |
| Ibuprofen | 50 | Yes | Yes |
| Ketoprofen | 50 | Yes | Not determined |
| Lopinavir | 50 | Yes | Yes |
| Prednisolone | 30 | Yes | Yes |
| Ritonavir (1) | 30 | Yes | Yes |
| Ritonavir (2) | 50 | Yes | Not determined |
| Sulfamethoxazole | 30 | Yes | Yes |
| Telmisartan (1) | 30 | Yes | Yes |
| Telmisartan (2) | 50 | Yes | Yes |
| Tolfenamic acid (1) | 30 | Yes | Yes |
| Tolfenamic acid (2) | 50 | Yes | Yes |

Figure 3:
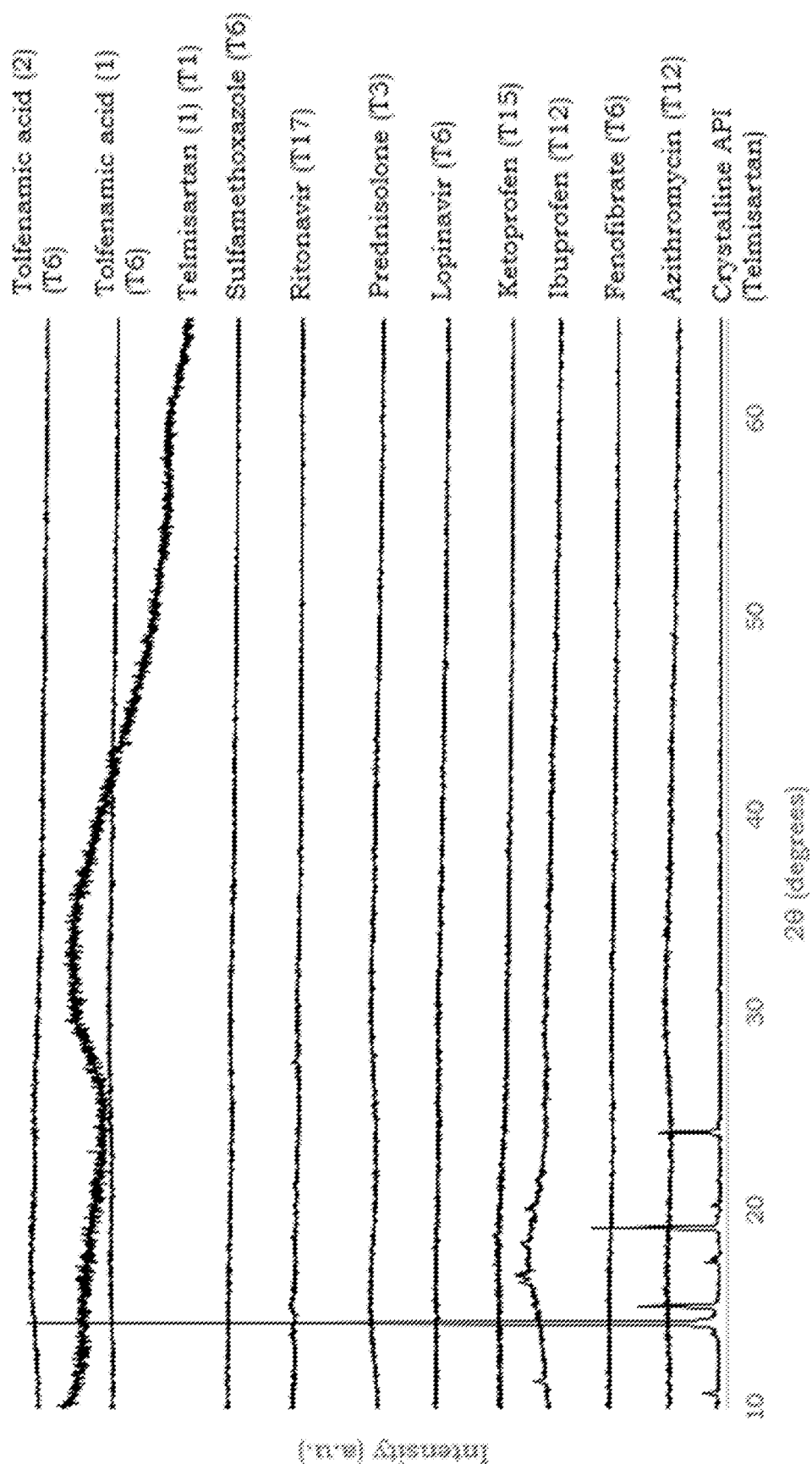
FIG. 3 (Example 2) shows an X-ray powder diffractogram (XRPD) of MMC-API after storage at room temperature and 75% relative humidity. The 2θ range in this figure was limited to 10-65 degrees. Crystalline API (telmisartan) was measured as reference. T1, T3, T6, T12, T15 and T17 is the time period of storage for each respective MMC-API.

After storage for 1 month at 75% relative humidity and room temperature, the samples (MMC-API) were analyzed with XRPD and DSC again. Samples were also analyzed after storage for 3 months or longer (3 months, 6 months, 12 months (1 year), 15 months and/or 17 months). The results are shown in Table 2c and FIG. 3.

TABLE 2c

Physical state of solid substantially amorphous API (i.e. MMC-API) after storage at room temperature and 75% relative humidity.

| API in the MMC-API admixture | API load [wt %] | XRPD and DSC amorphous after storage [1 month] | XRPD and DSC amorphous after storage [n months] |
|---|---|---|---|
| Azithromycin | 30 | Yes | Yes, 12 months |
| Fenofibrate | 30 | Yes | Yes, 6 months |
| Ibuprofen | 50 | Not determined | Yes, 12 months |
| Ketoprofen | 50 | Yes | Yes, 15 months |
| Lopinavir | 50 | Yes | Yes, 6 months |
| Prednisolone | 30 | Yes | Yes, 3 months |
| Ritonavir | 50 | Yes | Yes, 17 months |
| Sulfamethoxazole | 30 | Yes | Yes, 6 months |
| Telmisartan | 30 | Yes | Yes, 12 months |
| Tolfenamic acid | 30 | Yes | Yes, 6 months |
| Tolfenamic acid | 50 | Yes | Yes, 6 months |

Example 3—General Method for the Preparation and Stability Testing of an MMC-API A suitable amount of API is added to a container whereupon an adequate amount of a suitable organic solvent is added in order to dissolve the API. The API-solvent mixture is sonicated at a temperature in the range from room temperature to 55° C., or as applicable, until the API is completely dissolved (typically 1-150 minutes). Furthermore, MMC according to the present invention is added to the API solution. The target API load is 20-30% by weight. The mesoporous particles (MMC) are mixed with the API solution at room temperature (20-25° C.) by swirling the flask by hand for 10 seconds whereupon the container is attached to a rotary evaporator (Rotavapor® R-300 with Heating Bath B-305, Heating Bath B-300 Base, Vacuum pump V-300 and Interface 1-300 or Interface 1-300 Pro, Büchi, Flawil, Switzerland). Solvent is evaporated from the mixture at a pressure in the range from 50-990 mbar at a temperature in the range from room temperature to 60° C. and a rotation speed of 60 rpm or 100 rpm. The solid substantially amorphous active pharmaceutical ingredient, herein called an MMC-API, obtained from solvent evaporation is thereafter put into an oven for final drying typically at 80° C. for 16-92 hours. The finally dried intermediate is removed from the container and analyzed by nitrogen gas adsorption to determine pore size, pore volume and BET surface area, as well as XRPD and DSC to determine whether the API is present in its amorphous state.

Nitrogen gas adsorption is performed on a Tristar® II Plus 3030 surface area and porosity analyzer (Micromeritics, Norcross, GA, USA) operated at 77.3 K. 100-200 mg MMC-API is added to a sample tube and degassed under vacuum for at least 12 hours at 105° C. prior to analysis.

XRPD is measured using a Bruker D8 TwinTwin X-ray Diffractometer (Bruker UK Ltd., Coventry, UK) with Cu-K$_\alpha$ radiation ($\lambda$=1.54 Å). Prior to the analysis, MMC-APIs are ground, dispersed in a solvent such as ethanol and applied as a thin layer upon a zero-background silicon sample holder, or ground and applied upon a zero-background silicon sample holder as dry material. Any remaining solvent is evaporated under a heat lamp prior to the analysis. The analysis set-up is in the 2θ range 20-80 degrees, 5-80 degrees or 5-65 degrees.

DSC analysis is performed using a DSC Q2000 (TA Instruments, Newcastle, DE, USA). 2-3 mg of MMC-API is applied onto an aluminum pan, onto which an aluminum lid is placed and firmly closed using a crimper. To allow moisture from the sample to evaporate during the analysis, a pinhole is made in the middle of the pan using a needle.

The DSC analysis was run accordingly:
Cycle 1:
  Equilibration at −35° C.
Cycle 2:
  Ramp 10° C./min to 80.00° C.
  Isothermal for 5 minutes.
  Ramp 10° C./min to −35° C.
Cycle 3:
  Ramp 10° C./min to well above melting temperature of each respective API.

Solid substantially amorphous active pharmaceutical ingredients (MMC-APIs) are stored at room temperature in a desiccator containing a saturated NaCl solution, providing for a 75% relative humidity atmosphere. After 1 month and n months of storage, respectively, the MMC-APIs are analyzed with XRPD and DSC, as described above, to determine whether they are still amorphous or if they have crystallized.

Example 4—Preparation and Stability Testing of Solid Substantially Amorphous Dapagliflozin (i.e. MMC-Dapagliflozin)

1499.8 mg dapagliflozin was added to an evaporation flask. 250 ml ethyl acetate was added in order to dissolve the dapagliflozin. The mixture was sonicated for 5 minutes at 20° C. followed by 20 minutes at 50° C. until the dapagliflozin was dissolved. 3499.2 mg of mesoporous particles (MMC) were added to the dapagliflozin solution. The target API load of dapagliflozin was 30 wt %. The mesoporous particles (MMC) were mixed with the dapagliflozin solution at room temperature (20-25° C.) by swirling the flask by hand for 10 seconds, whereupon the evaporation flask was attached to the rotary evaporator (with Interface I-300 Pro). The solvent was evaporated from the mixture at 250 mbar, a temperature of 40° C. and a rotation speed of 60 rpm. After 15 minutes the pressure was reduced to 200 mbar whereupon the evaporation continued an additional 35 minutes. The pressure was further reduced to 190 mbar and the evaporation additionally continued for 60 minutes. Lastly the pressure was reduced to 150 mbar for 1 minute until the ethyl acetate had evaporated and a solid, substantially amorphous dapagliflozin, herein called MMC-dapagliflozin, was obtained. The MMC-dapagliflozin was put into an oven for final drying at 80° C. for 24 hours. The finally dried MMC-dapagliflozin was removed from the evaporation flask and analyzed by nitrogen gas adsorption to determine pore size, pore volume and BET surface area, and XRPD and DSC to determine whether dapagliflozin was present in its amorphous state.

Nitrogen gas adsorption was performed on a Tristar® II Plus 3030 surface area and porosity analyzer (Micromeritics, Norcross, GA, USA) operated at 77.3 K. 100-200 mg MMC-dapagliflozin was added to a sample tube and degassed under vacuum for at least 12 hours at 105° C. prior to analysis.

XRPD was measured using a Bruker D8 TwinTwin X-ray Diffractometer (Bruker UK Ltd., Coventry, UK) with Cu-K$_\alpha$ radiation (λ=1.54 Å). The MMC-dapagliflozin was ground, dispersed in ethanol to make a suspension and applied onto a silicon zero background sample holder. The solvent was evaporated under light prior to the analysis. The analysis set-up was in the 2θ range: 5-80 degrees.

DSC analysis was performed using a DSC Q2000 (TA Instruments, Newcastle, DE, USA). 3.0 mg of MMC-dapagliflozin was added to an aluminum pan, onto which an aluminum lid was placed and firmly closed using a crimper. To allow moisture from the sample to evaporate during the analysis, a pinhole was made in the middle of the pan using a needle.

The DSC analysis was run accordingly:
Cycle 1:
  Equilibration at −35° C.
Cycle 2:
  Ramp 10° C./min to 80.00° C.
  Isothermal for 5 minutes.
  Ramp 10° C./min to −35° C.
Cycle 3:
  Ramp 10° C./min to 300° C.

The MMC-dapagliflozin was stored at room temperature in a desiccator containing a saturated NaCl solution, resulting in a 75% relative humidity atmosphere. After 1 month and 3 months of storage the MMC-dapagliflozin was analyzed with XRPD and DSC, according to described methods herein, to determine whether it was still amorphous or if it had crystallized.

The specific conditions given in this example for the loading of dapagliflozin into the particulate anhydrous and substantially amorphous mesoporous magnesium carbonate is summarized in Table 3a and Table 3b. Specific conditions, according to the general API loading procedure previously described in Example 3, for the APIs afatinib, bosutinib, crizotinib, gefitinib, ibrutinib, lesinurad, luliconazole, macitentan, nintedanib, osimertinib, panabinostat, posaconazole, regorafenib, rilpivirine, riociguat, rivaroxaban, selexipag, sorafenib and vilazodone, are also presented in Table 3a and Table 3b below. All MMC-APIs were analyzed by nitrogen gas adsorption, XRPD and/or DSC as described above.

TABLE 3a

Selected APIs loaded into MMC, amounts and parameters applied to produce the corresponding amorphous MMC-APIs.

| API in the MMC-API admixture | API load [wt %] | API [mg] | Solvent [ml] | Sonication [37 Hz] [° C.] | [Min] | MMC [mg] |
|---|---|---|---|---|---|---|
| Dapagliflozin | 30 | 1499.8 | Ethyl acetate 250 | 20 50 | 5 20 | 3499.2 |
| Afatinib | 30 | 904.5 | Ethanol 400 | 50 | 10 | 2100.7 |
| Afatinib | 30 | 1499.7 | Acetone 260 | RT | 9 | 3500.1 |
| Bosutinib | 30 | 1514.2 | Acetone 500 | RT | 15 | 3506.3 |

TABLE 3a-continued

Selected APIs loaded into MMC, amounts and parameters applied to produce the corresponding amorphous MMC-APIs.

| API in the MMC-API admixture | API load [wt %] | API [mg] | Solvent [ml] | Sonication [37 Hz] [° C.] | [Min] | MMC [mg] |
|---|---|---|---|---|---|---|
| Lesinurad | 30 | 1499.6 | Ethanol 500 | 50 | 35 | 3501.7 |
| Nintedanib | 20 | 211.8 | Ethyl acetate 250 | 50 | 15 | 802.5 |
| Osimertinib | 30 | 900.2 | Ethanol 700 | 50 | 60 | 2104.1 |
| Panabinostat | 30 | 901.2 | Ethanol + 0.1% 1M HCl 600 | 50 | 45 | 2109.1 |
| Ibrutinib | 30 | 1500.2 | Acetone 600 | RT | 5 | 3499.1 |
| Macitentan | 30 | 1525.3 | Acetone 250 | 50 | 5 | 3526.9 |
| Selexipag | 30 | 905.2 | Ethanol 400 | 50 | 15 | 2109.3 |
| Sorafenib | 20 | 452.8 | Acetone 500 | 40 | 10 | 1802.8 |
| Crizotinib | 30 | 1506.1 | Ethyl acetate 500 | 50 | 60 | 3504.2 |
| Gefitinib | 20 | 203.6 | Dichloromethane 250 | 35 | 20 | 801.2 |
| Luliconazole | 30 | 1500.6 | Acetone 400 | RT | 4 | 3443.2 |
| Posaconazole | 30 | 312.4 | Acetone 550 | 40 | 150 | 719.3 |
| Regorafenib | 25 | 499.8 | Acetone 550 | 55 | 33 | 1500.3 |
| Rilpivirine | 30 | 185.7 | Ethanol 250 | 50 | 5 | 420.2 |
| Riociguat | 30 | 304.7 | Acetone 300 | 50 | 10 | 704.7 |
| Vilazodone (HCl) | 30 | 1500.2 | Ethanol 1000 | 50 | 120 | 3502.3 |

TABLE 3b

Specific conditions for loading of APIs into MMC through solvent evaporation according to the general loading description, applied to produce the corresponding amorphous MMC-APIs.

| API in the MMC-API admixture | Rotation speed [rpm] | Solvent evaporation Temperature [° C.] | Pressure [mbar] | Duration [min] | Final drying [hours] |
|---|---|---|---|---|---|
| Dapagliflozin | 60 | 40 | 250 | 15 | 24 |
|  |  | 40 | 200 | 35 |  |
|  |  | 40 | 190 | 60 |  |
|  |  | 40 | 150 | 1 |  |
| Afatinib | 60 | 50 | 170 | 10 | 16 |
|  |  | 50 | 150 | 180 |  |
| Afatinib | 60 | 40 | 400 | 55 | 23 |
| Bosutininb | 60 | 35 | 400 | 60 | 24 |
|  |  | 40 | 370 | 120 |  |
| Lesinurad | 60 | 50 | 270 | 3 | 40 |
|  |  | 50 | 230 | 7 |  |
|  |  | 50 | 170 | 180 |  |
| Nintedanib | 60 | 45 | 200 | 5 | 24 |
|  |  | 45 | 170 | 90 |  |
| Osimertinib | 60 | 50 | 300 | 10 | 20 |
|  |  | 50 | 250 | 5 |  |
|  |  | 50 | 200 | 5 |  |
|  |  | 50 | 150 | 180 |  |
| Panabinostat | 60 | 50 | 250 | 5 | 24 |
|  |  | 50 | 150 | 180 |  |
| Ibrutinib | 60 | 45 | 400 | 5 | 24 |
|  |  | 45 | 350 | 10 |  |
|  |  | 45 | 360 | 75 |  |
| Macitentan | 60 | 45 | 350 | 85 | 24 |
| Selexipag | 60 | 50 | 170 | 180 | 20 |
| Sorafenib | 60 | 55 | 550 | 2 | 96 |
|  |  | 55 | 500 | 2 |  |
|  |  | 55 | 450 | 2 |  |
|  |  | 55 | 400 | 10 |  |
|  |  | 55 | 350 | 1 |  |
|  |  | 55 | 300 | 5 |  |
| Crizotinib | 60 | 45 | 600-250 | 5 | 24 |
|  |  | 45 | 250-230 | 10 |  |
|  |  | 45 | 230 | 145 |  |
| Gefitinib | 100 | 40 | 900 | 5 | 24 |
|  |  | 40 | 880 | 2 |  |
|  |  | 40 | 850 | 3 |  |
|  |  | 40 | 800 | 2 |  |

TABLE 3b-continued

Specific conditions for loading of APIs into MMC through solvent evaporation according to the general loading description, applied to produce the corresponding amorphous MMC-APIs.

| API in the MMC-API admixture | Rotation speed [rpm] | Solvent evaporation Temperature [° C.] | Pressure [mbar] | Duration [min] | Final drying [hours] |
|---|---|---|---|---|---|
| | | 40 | 700 | 2 | |
| | | 40 | 650 | 5 | |
| | | 40 | 600 | 10 | |
| | | RT | 500 | 3 | |
| Luliconazole | 60 | 45 | 400 | 80 | 24 |
| Posaconazole | 100 | 45 | 500 | 25 | 24 |
| | | 50 | 670 | 120 | |
| Regorafenib | 100 | 50 | 500 | 3 | 20 |
| | | 55 | 450 | 2 | |
| | | 55 | 400 | 11 | |
| | | RT | 300 | 5 | |
| Rilpivirine | 60 | 50 | 200 | 120 | 90 |
| | | 50 | 150 | 120 | |
| Riociguat | 60 | 45 | 420 | 60 | 24 |
| Vilazodone (HCl) | 60 | 50 | 300 | 6 | 20 |
| | | 50 | 250 | 15 | |
| | | 50 | 200 | 10 | |
| | | 50 | 150 | 220 | |

Results

Figure 4:
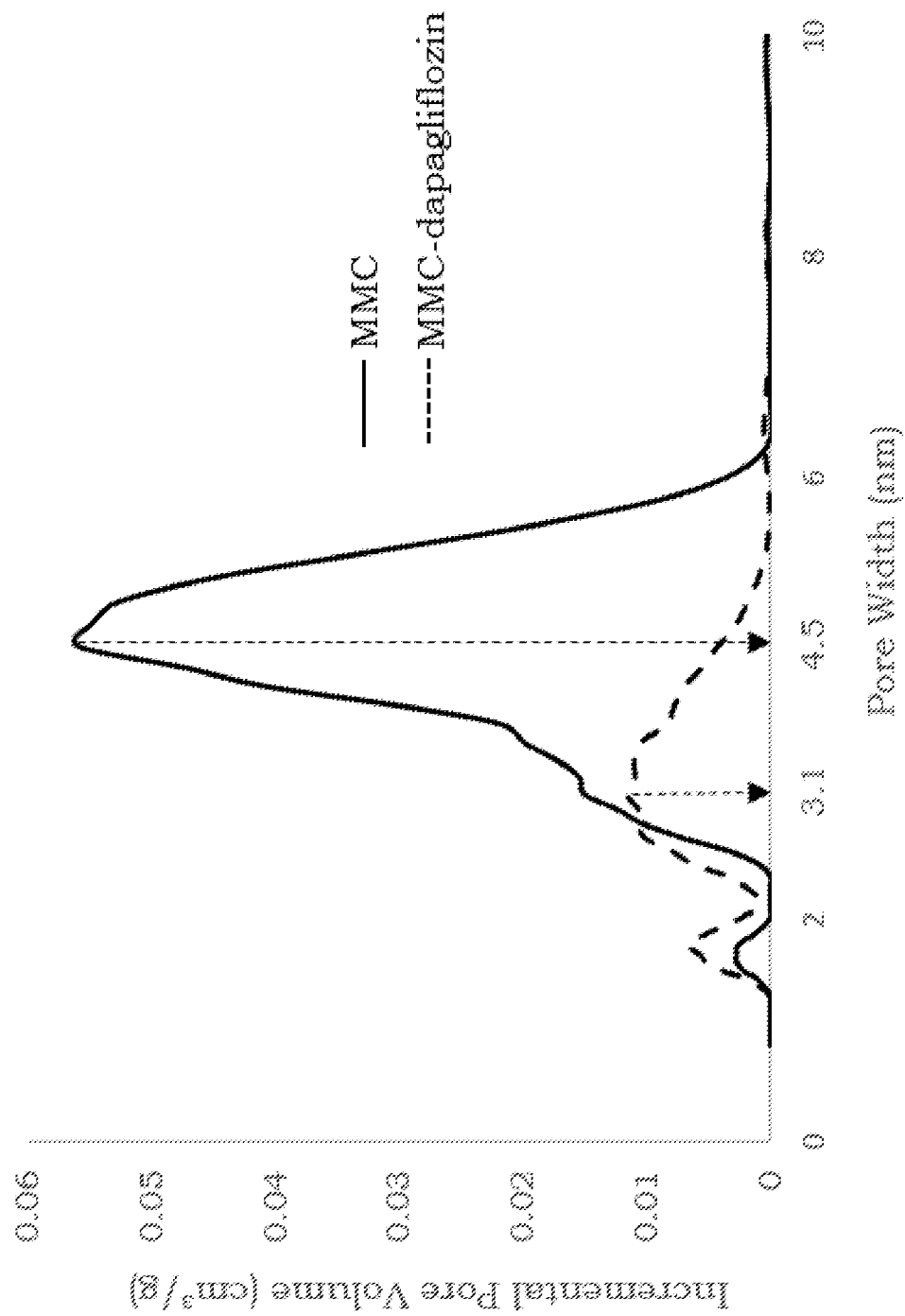
FIG. 4 (Example 4) shows the peak pore width of MMC Batch 2 compared to dapagliflozin loaded into MMC Batch 2 (referred to as MMC-dapagliflozin).
Figure 5:
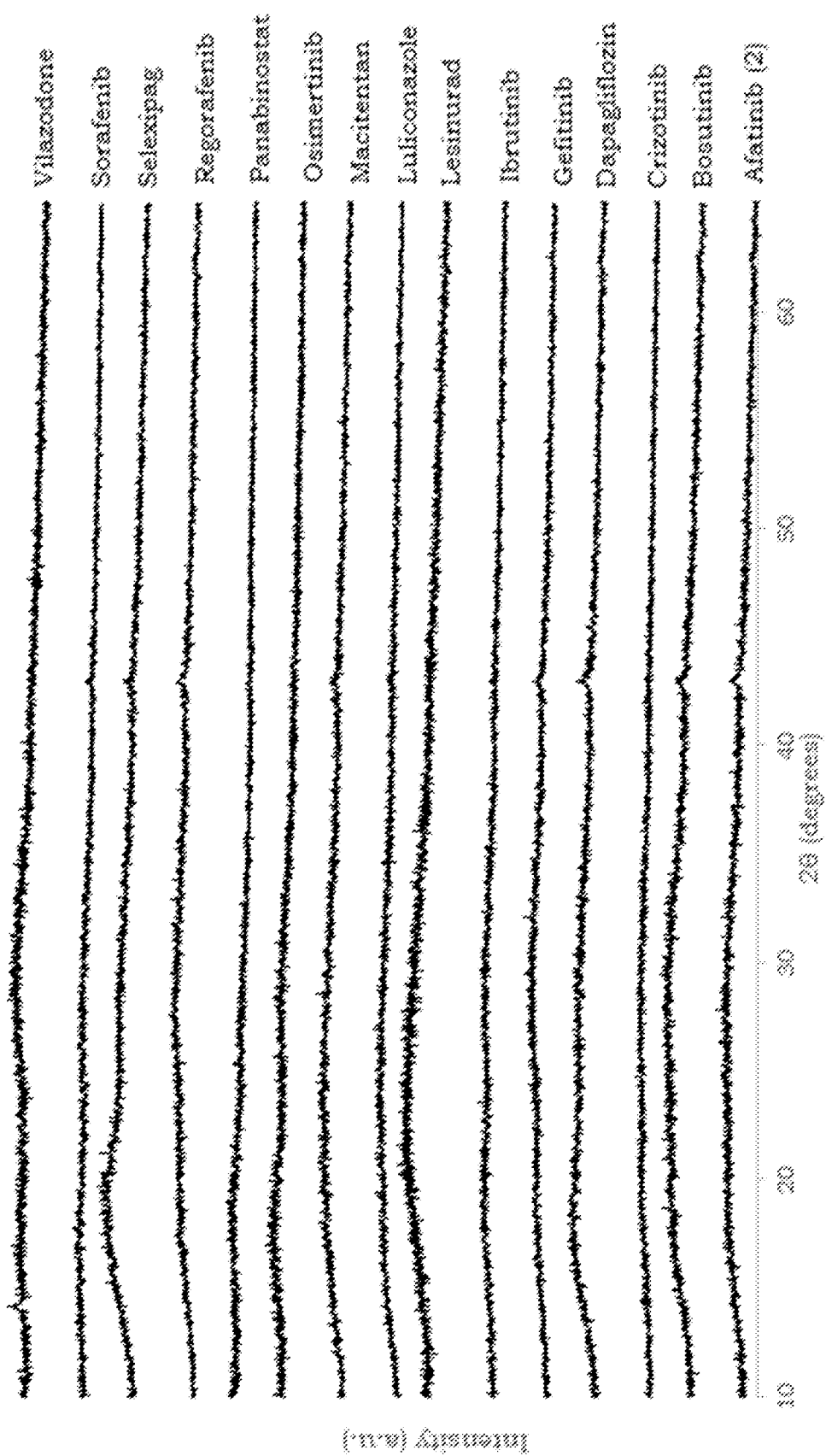
FIG. 5 (Example 4) shows an X-ray powder diffractogram (XRPD) of solid substantially amorphous API (i.e. MMC-API), after loading of an API in a particulate anhydrous and substantially amorphous mesoporous magnesium carbonate (MMC). The 2θ range in this figure was limited to 10-65 degrees.

All APIs were loaded in the particulate anhydrous and substantially amorphous mesoporous magnesium carbonate (MMC) as can be seen by the change in pore volume, BET surface area and pore size. Results from nitrogen gas adsorption of unloaded mesoporous particulate magnesium carbonate (MMC) (Table 3c) and the material (MMC) after loading (Table 3d) are presented below. The peak pore width of MMC Batch 2 compared to dapagliflozin loaded into MMC Batch 2 (referred to as MMC-dapagliflozin) is illustrated in FIG. 4.

TABLE 3c

Pore volume, BET surface area and peak pore width of MMC.

| MMC | Pore Volume at p/p₀ 0.97 [cm³/g] | BET Surface Area [m²/g] | Peak Pore Width [nm] |
|---|---|---|---|
| Batch 1 | 0.69 | 438 | 4.9 |
| Batch 2 | 0.55 | 381 | 4.6 |
| Batch 3 | 0.56 | 373 | 4.7 |
| Average (Batch 1, 2 and 3) | 0.60 | 397 | 4.7 |

TABLE 3d

Pore volume, BET surface area and peak pore width of MMC-API, i.e. after loading of API into MMC.

| API in the MMC-API admixture | API load | Pore Volume at p/p₀ 0.97 [cm³/g] | BET Surface Area [m²/g] | Peak Pore Width [nm] |
|---|---|---|---|---|
| Afatinib (1) | 30 | 0.43 | 298 | 4.9 |
| Afatinib (2) | 30 | 0.20 | 182 | 4.1 |
| Bosutinib | 30 | 0.20 | 175 | 4.1 |
| Crizotinib | 30 | 0.27 | 250 | 4.1 |
| Dapagliflozin | 30 | 0.20 | 234 | 3.1 |
| Gefitinib | 20 | 0.37 | 296 | 4.5 |
| Ibrutinib | 30 | 0.32 | 298 | 4.1 |
| Lesinurad | 30 | 0.23 | 211 | 4.5 |
| Luliconazole | 30 | 0.27 | 280 | 4.1 |
| Macitentan | 30 | 0.27 | 271 | 3.6 |
| Nintedanib | 20 | 0.40 | 336 | 4.5 |
| Osimertinib | 30 | 0.45 | 326 | 4.5 |
| Panabinostat | 30 | 0.27 | 170 | 5.1 |
| Posaconazole | 30 | 0.24 | 210 | 4.1 |
| Regorafenib | 25 | 0.45 | 385 | 4.3 |
| Rilpivirine | 30 | 0.67 | 405 | 5.1 |
| Riociguat | 30 | 0.57 | 393 | 4.5 |
| Rivaroxaban | 20 | 0.36 | 308 | 4.1 |
| Selexipag (1) | 30 | 0.34 | 246 | 4.7 |
| Selexipag (2) | 30 | 0.19 | 185 | 3.6 |
| Sorafenib | 20 | 0.40 | 340 | 4.3 |
| Vilazodone | 30 | 0.69 | 427 | 5.1 |

According to results from XRPD and/or DSC, all loaded APIs measured were amorphous, as shown in Table 3e and Figure S.

TABLE 3e

Physical state of API after loading into MMC (i.e. MMC-API).

| API in the MMC-API admixture | API load | XRPD amorphous after loading | DSC amorphous after loading |
|---|---|---|---|
| Afatinib (1) | 30 | Not determined | Yes |
| Afatinib (2) | 30 | Yes | Yes |
| Bosutinib | 30 | Yes | Yes |
| Crizotinib | 30 | Yes | Yes |
| Dapagliflozin | 30 | Yes | Yes |
| Gefitinib | 20 | Yes | Yes |
| Ibrutinib | 30 | Yes | Yes |
| Lesinurad | 30 | Yes | Yes |
| Luliconazole | 30 | Yes | Yes |
| Macitentan | 30 | Yes | Yes |
| Nintedanib | 20 | Not determined | Yes |
| Osimertinib | 30 | Yes | Yes |
| Panobinostat | 50 | Yes | Yes |
| Posaconazole | 30 | Not determined | Yes |
| Regorafenib | 25 | Yes | Yes |
| Rilpivirine | 30 | Not determined | Yes |
| Riociguat | 30 | Not determined | Yes |
| Rivaroraxaban | 20 | Not determined | Yes |
| Selexipag (1) | 30 | Not determined | Yes |
| Selexipag (2) | 30 | Yes | Yes |
| Sorafenib | 20 | Yes | Yes |
| Vilazodone | 30 | Yes | Yes |

Figure 6:
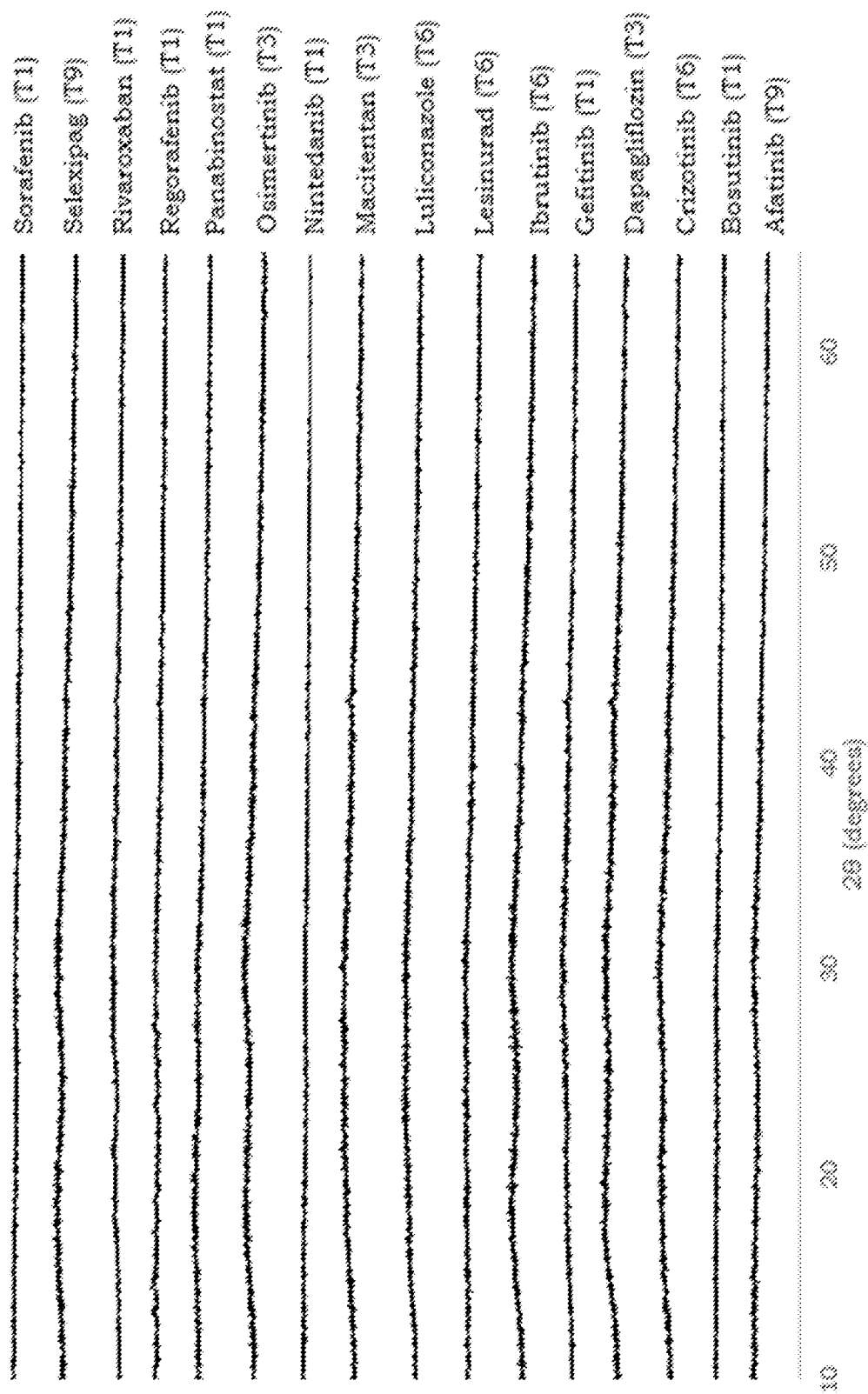
FIG. 6 (Example 4) shows an X-ray powder diffractogram (XRPD) of solid substantially amorphous API (i.e. MMC-API) after storage at room temperature and 75% relative humidity. The 2θ range in this figure was limited to 10-65 degrees. T1, T3, T6, and T9 is the time period of storage for each respective MMC-API.
Figure 7:
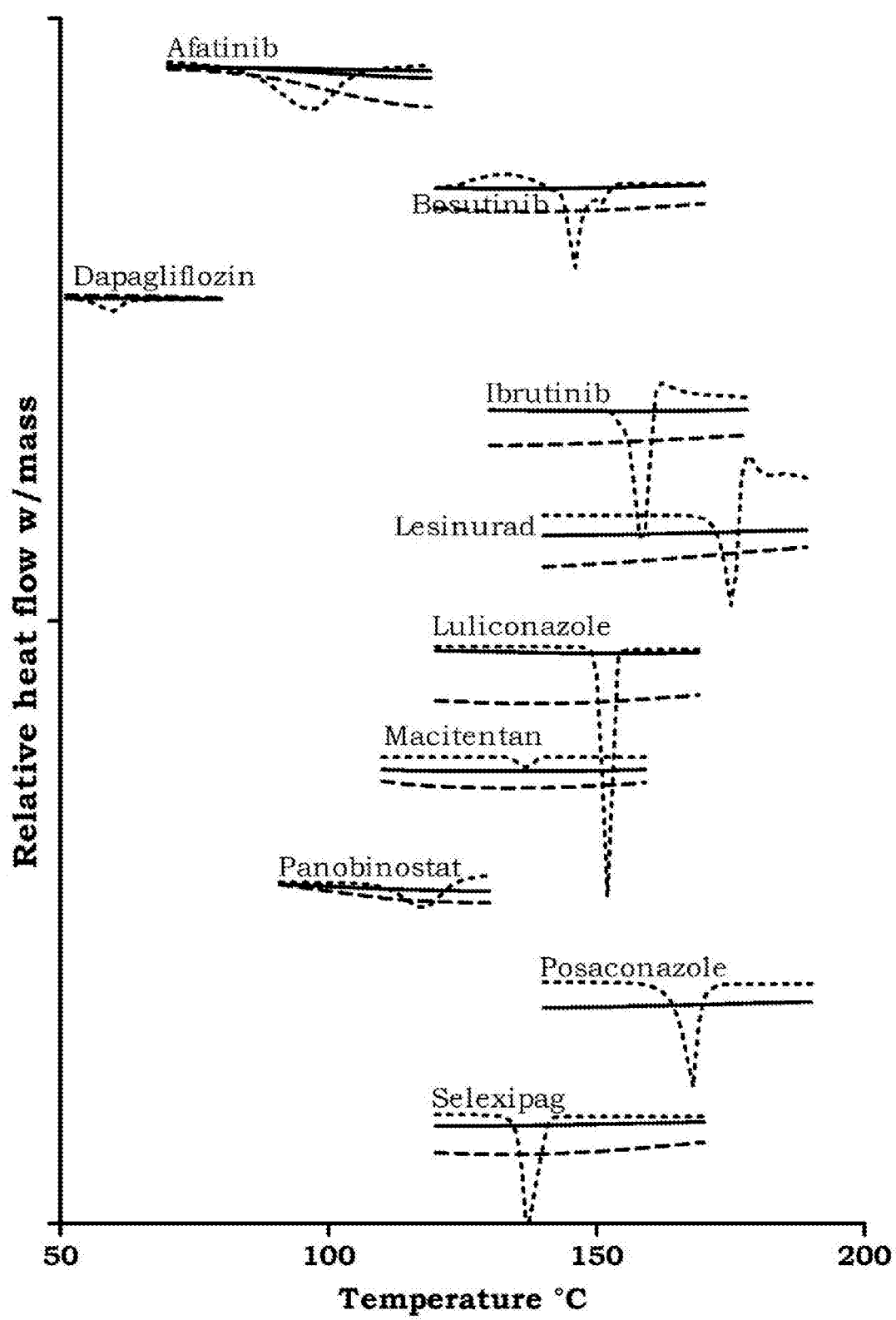
FIG. 7 and FIG. 8 shows thermograms recorded by using DSC for crystalline low (FIG. 7) and high (FIG. 8) melting APIs (dotted), corresponding MMC-APIs and stability samples (dashed). None of the MMC-APIs or stability samples exhibit endothermic signals indicating presence of crystalline API. The relative heat flow thermograms are separated for clarity.
Figure 8:
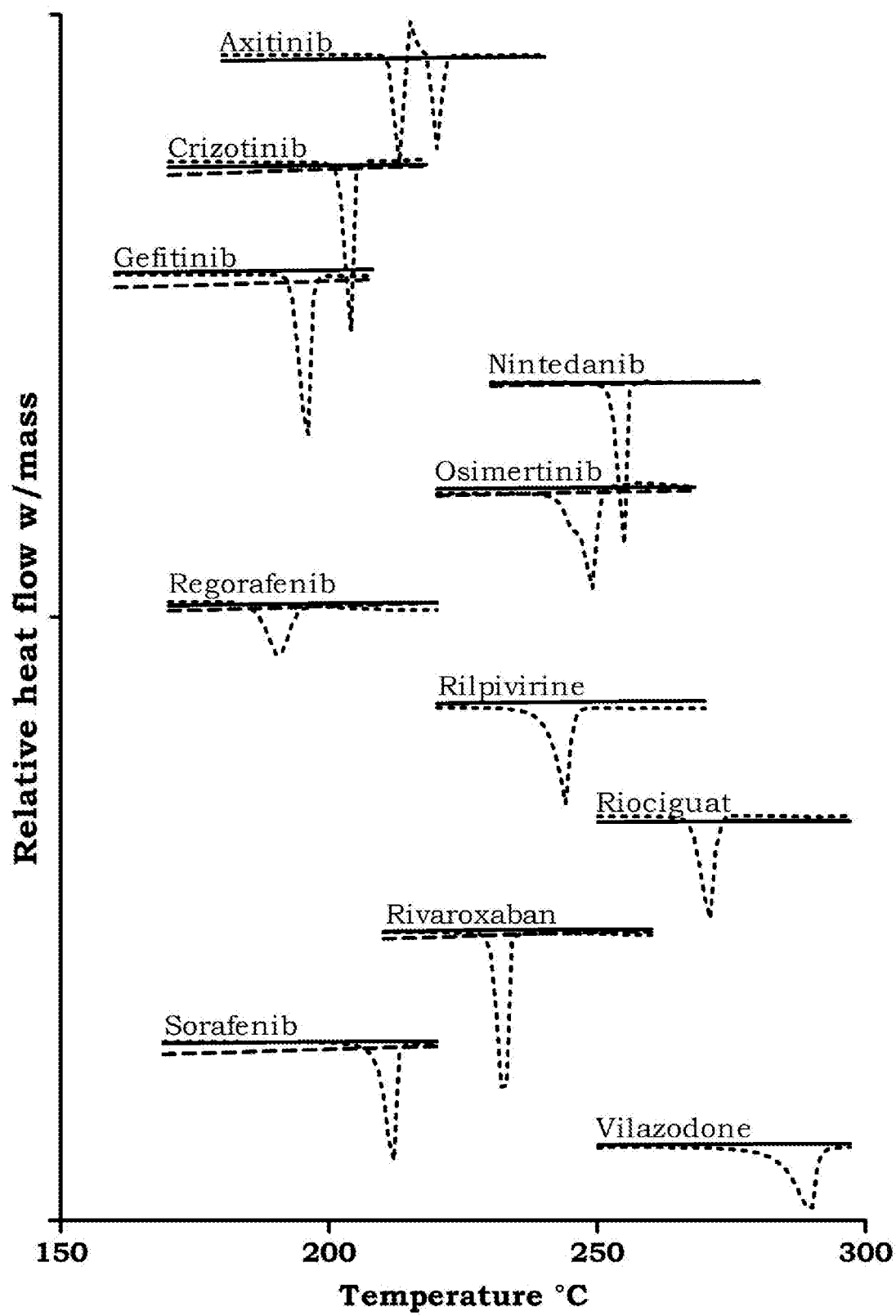

After storage for 1 month at 75% relative humidity and room temperature, the MMC-APIs (except for afatinib (2), rilpivirine, riociguat, selexipag (2) and vilazodone) were analyzed with XRPD and DSC again. Results from XRPD and DSC are presented in Table 3f and illustrated in FIG. 6, FIG. 7 and FIG. 8.

TABLE 3f

Physical state of solid substantially amorphous API (i.e. MMC-API) after storage at room temperature and 75% relative humidity.

| API in the MMC-API admixture | API load | XRPD and DSC amorphous after storage [1 month] | XRPD and DSC amorphous after storage [n months] |
|---|---|---|---|
| Afatinib (1) | 30 | Yes, 2 months | Yes, 9 months |
| Bosutinib | 30 | Yes | Not determined |
| Crizotinib | 30 | Yes | Yes, 6 months |
| Dapagliflozin | 30 | Yes | Yes, 3 months |

TABLE 3f-continued

Physical state of solid substantially amorphous API (i.e. MMC-API) after storage at room temperature and 75% relative humidity.

| API in the MMC-API admixture | API load | XRPD and DSC amorphous after storage [1 month] | XRPD and DSC amorphous after storage [n months] |
|---|---|---|---|
| Gefitinib | 20 | Yes | Not determined |
| Ibrutinib | 30 | Yes | Yes, 6 months |
| Lesinurad | 30 | Yes | Yes, 6 months |
| Luliconazole | 30 | Yes | Yes, 6 months |
| Macitentan | 30 | Yes | Yes, 3 months |
| Nintedanib | 20 | Yes | Not determined |
| Osimertinib | 30 | Yes | Yes, 3 months |
| Panobinostat | 50 | Yes | Not determined |
| Regorafenib | 25 | Yes | Not determined |
| Rivaroraxaban | 20 | Yes | Not determined |
| Selexipag (1) | 30 | Yes | Yes, 9 months |
| Sorafenib | 20 | Yes | Not determined |

Example 5—Flowability of Solid Substantially Amorphous APIs (MMC-APIs)

The particulate anhydrous and substantially amorphous mesoporous magnesium carbonate (MMC) was prepared as described in Example 1, with the exception that the final heat-treatment was performed with a 10 hour ramp up to 250° C. and then a 10 hour hold time at 250° C., and then free cooling to room temperature. The MMC was analyzed as described in Material Characterization. The mesoporous particulate material (MMC) had an average BET surface area in the range of about 320-445 m$^2$/g, an average pore volume in the range of about 0.5-0.8 cm$^3$/g with about 100% of the pore volume from pores <10 nm in diameter. The magnesium oxide (MgO) used was purchased from Lehmann&Voss&Co.

The MMC material was divided into three batches to be loaded with three different APIs (azithromycin, ibuprofen and ritonavir). The different size fractions of the different batches were loaded with 30 wt % azithromycin, 30 wt % ritonavir and 30 wt % ibuprofen, respectively, to provide solid amorphous APIs (i.e. MMC-API). The solid amorphous APIs (MMC-APIs), were prepared and characterized as described in Example 2. The flow properties for the solid amorphous APIs (MMC-APIs), were determined as described in Material Characterization.

The results are summarized in Table 4a, Table 4b and Table 4c below.

TABLE 4a

Particle size distribution and physical state of solid azithromycin loaded into MMC of sample fractions according to Example 1, i.e. a specific MMC-API.

| MMC-API | Amorphous or crystalline* | $D_{10}$ [µm] | $D_{50}$ [µm] | $D_{90}$ [µm] | $D_{98}$ [µm] |
|---|---|---|---|---|---|
| 1 | Amorphous | 434 | 664 | 1010 | 1260 |
| 2 | Amorphous | 144 | 231 | 358 | 444 |
| 3 | Amorphous | 81 | 141 | 216 | 265 |
| 4 | Amorphous | 26 | 96 | 161 | 205 |
| 5 | Amorphous | 15.9 | 69 | 129 | 209 |

*The MMC-API is classified as crystalline if there are sharp peaks present in the diffractogram and/or if a melting point are detected using DSC.

TABLE 4b

Particle size distribution and physical state of solid ritonavir loaded into MMC of sample fractions according to Example 1, i.e. a specific MMC-API.

| MMC-API | Amorphous or crystalline* | $D_{10}$ [µm] | $D_{50}$ [µm] | $D_{90}$ [µm] | $D_{98}$ [µm] |
|---|---|---|---|---|---|
| 1 | Amorphous | 424 | 658 | 1010 | 1260 |
| 2 | Amorphous | 137 | 225 | 347 | 431 |
| 3 | Amorphous | 77.9 | 140 | 218 | 269 |
| 4 | Amorphous | 14.3 | 89.4 | 154 | 195 |
| 5 | Amorphous | 15 | 64.5 | 115 | 150 |

*The MMC-API is classified as crystalline if there are sharp peaks present in the diffractogram and/or if a melting point are detected using DSC.

TABLE 4c

Particle size distribution and physical state of solid ibuprofen loaded into MMC of sample fractions according to Example 1, i.e. a specific MMC-API.

| MMC-API | Amorphous or crystalline* | $D_{10}$ [µm] | $D_{50}$ [µm] | $D_{90}$ [µm] | $D_{98}$ [µm] |
|---|---|---|---|---|---|
| 1 | Amorphous | 406 | 632 | 961 | 1210 |
| 2 | Amorphous | 130 | 221 | 346 | 432 |
| 3 | Amorphous | 79.7 | 146 | 238 | 307 |
| 4 | Amorphous | 19.3 | 93.9 | 265 | 215 |
| 5 | Amorphous | 14.8 | 67.8 | 131 | 318 |

*The MMC-API is classified as crystalline if there are sharp peaks present in the diffractogram and/or if a melting point are detected using DSC.

The results from the bulk and tapped density measurements are shown in Table 4d, Table 4e and Table 4f below.

TABLE 4d

Flow properties of solid azithromycin loaded into MMC of sample fractions according to Example 1. i.e. a specific MMC-API. Values are given as mean and (s.d).

| MMC-API | Bulk density [g/ml] | Tapped density [g/ml] | Carr index | Hausner ratio | Flow property* |
|---|---|---|---|---|---|
| 1 | 0.66 (0.01) | 0.69 (0.01) | 4.0 (0.05) | 1.04 (0.00) | Excellent |
| 2 | 0.63 (0.00) | 0.67 (0.01) | 6.7 (1.15) | 1.07 (0.01) | Excellent |
| 3 | 0.60 (0.01) | 0.68 (0.01) | 12.0 (2) | 1.14 (0.03) | Good |
| 4 | 0.56 (0.01) | 0.67 (0.02) | 17.3 (1.15) | 1.21 (0.02) | Fair |
| 5 | 0.54 (0.01) | 0.70 (0.01) | 22.7 (1.15) | 1.29 (0.02) | Passable |

*According to European Pharmacopeia 9.0 (2016), Chapter 2.9.36. Powder Flow

TABLE 4e

Flow properties of solid ritonavir loaded into MMC of sample fractions according to Example 1. i.e. a specific MMC-API. Values are given as mean and (s.d).

| MMC-API | Bulk density [g/ml] | Tapped density [g/ml] | Carr index | Hausner ratio | Flow property* |
|---|---|---|---|---|---|
| 1 | 0.66 (0.01) | 0.68 (0.00) | 3.3 (1.15) | 1.03 (0.01) | Excellent |
| 2 | 0.65 (0.00) | 0.71 (0.00) | 8.0 (0) | 1.09 (0) | Excellent |
| 3 | 0.61 (0.01) | 0.71 (0.01) | 14.7 (1.15) | 1.17 (0.02) | Good |
| 4 | 0.58 (0.01) | 0.75 (0.01) | 22.0 (0) | 1.28 (0) | Passable |
| 5 | 0.55 (0.00) | 0.72 (0.01) | 23.3 (1.15) | 1.30 (0.02) | Passable |

*According to European Pharmacopeia 9.0 (2016), Chapter 2.9.36. Powder Flow

TABLE 4f

Flow properties of solid ibuprofen loaded into MMC of sample fractions according to Example 1. i.e. a specific MMC-API. Values are given as mean and (s.d).

| Sample | Bulk density [g/ml] | Tapped density [g/ml] | Carr index | Hausner ratio | Flow property* |
|---|---|---|---|---|---|
| 1 | 0.67 (0.01) | 0.68 (0.01) | 2.7 (1.15) | 1.03 (0.01) | Excellent |
| 2 | 0.62 (0.01) | 0.68 (0.01) | 8.0 (0) | 1.09 (0) | Excellent |
| 3 | 0.57 (0.02) | 0.65 (0.00) | 12.7 (2.31) | 1.15 (0.03) | Good |
| 4 | 0.57 (0.02) | 0.70 (0.04) | 18.5 (3.42) | 1.23 (0.05) | Fair |
| 5 | 0.54 (0.01) | 0.70 (0.01) | 23.3 (1.2) | 1.30 (0.02) | Passable |

*According to European Pharmacopeia 9.0 (2016), Chapter 2.9.36. Powder Flow

Example 6—Flowability of Solid Substantially Amorphous APIs Loaded into MMC, (i.e. MMC-APIs)

By following the procedure as described in Example 5 above, the different size fractions of the different MMC batches were loaded with 20 wt % azithromycin, 35 wt % ibuprofen, and 40 wt % ritonavir respectively, providing solid substantially amorphous API (i.e. MMC-APIs). Each respective MMC-API was prepared and characterized as described in Example 2. The flow properties for each MMC-API were determined as described in Material Characterization. The results are summarized in Table 6a, Table 6b and Table 6c below.

TABLE 6a

Particle size distribution and physical state of solid azithromycin (20 wt %) loaded into MMC (i.e. MMC-API).

| MMC-API | Amorphous or crystalline* | $D_{10}$ [μm] | $D_{50}$ [μm] | $D_{90}$ [μm] | $D_{98}$ [μm] |
|---|---|---|---|---|---|
| 1 | Amorphous | 401 | 651 | 1030 | 1310 |
| 2 | Amorphous | 147 | 237 | 389 | 1660 |
| 3 | Amorphous | 90.8 | 148 | 234 | 326 |
| 4 | Amorphous | 9.82 | 86.7 | 151 | 193 |
| 5 | Amorphous | 8.66 | 59.9 | 112 | 166 |

*The MMC-API is classified as crystalline if there are sharp peaks present in the diffractogram and/or if a melting point is detected using DSC.

TABLE 6b

Particle size distribution and physical state of solid ibuprofen (35 wt %) loaded into MMC (i.e. MMC-API).

| MMC-API | Amorphous or crystalline* | $D_{10}$ [μm] | $D_{50}$ [μm] | $D_{90}$ [μm] | $D_{98}$ [μm] |
|---|---|---|---|---|---|
| 1 | Amorphous | 302 | 613 | 1070 | 1410 |
| 2 | Amorphous | 117 | 260 | 588 | 2090 |
| 3 | Amorphous | 73.4 | 163 | 746 | 1470 |
| 4 | Amorphous | 23.6 | 102 | 664 | 1230 |
| 5 | Amorphous | 30 | 82.5 | 1160 | 2160 |

*The MMC-API is classified as crystalline if there are sharp peaks present in the diffractogram and/or if a melting point is detected using DSC.

TABLE 6c

Particle size distribution and physical state of solid ritonavir (40 wt %) loaded into MMC (i.e. MMC-API).

| MMC-API | Amorphous or crystalline* | $D_{10}$ [μm] | $D_{50}$ [μm] | $D_{90}$ [μm] | $D_{98}$ [μm] |
|---|---|---|---|---|---|
| 1 | Amorphous | 380 | 700 | 1240 | 1680 |
| 2 | Amorphous | 147 | 236 | 363 | 446 |
| 3 | Amorphous | 86.1 | 149 | 237 | 301 |
| 4 | Amorphous | 21.8 | 94.1 | 179 | 295 |
| 5 | Amorphous | 33.9 | 72.2 | 129 | 372 |

*The MMC-API is classified as crystalline if there are sharp peaks present in the diffractogram and/or if a melting point is detected using DSC.

The results from the bulk and tapped density measurements are shown in Table 6d, Table 6e and Table 6f below.

TABLE 6d

Flow properties for solid azithromycin (20 wt %) loaded into MMC (i.e. MMC-API). Values are given as mean and (s.d).

| MMC-API | Bulk density [g/ml] | Tapped density [g/ml] | Carr index | Hausner ratio | Flow property* |
|---|---|---|---|---|---|
| 1 | 0.54 (0) | 0.57 (0) | 6.67 (1.15) | 1.04 (0.01) | Excellent |
| 2 | 0.63 (0.01) | 0.72 (0.01) | 12.00 (0) | 1.14 (0) | Good |
| 3 | 0.63 (0) | 0.72 (0.01) | 12.67 (1.15) | 1.15 (0.02) | Good |
| 4 | 0.62 (0.01) | 0.82 (0.01) | 24.67 (1.15) | 1.33 (0.02) | Passable |
| 5 | 0.58 (0.01) | 0.79 (0.01) | 26.00 (0) | 1.35 (0) | Poor |

*According to European Pharmacopeia 9.0 (2016). Chapter 2.9.36. Powder Flow

TABLE 6e

Flow properties for solid ibuprofen (35 wt %) loaded into MMC (i.e. MMC-API). Values are given as mean and (s.d).

| MMC-API | Bulk density [g/ml] | Tapped density [g/ml] | Carr index | Hausner ratio | Flow property* |
|---|---|---|---|---|---|
| 1 | 0.67 (0.03) | 0.71 (0.01) | 6.0 (3.5) | 1.06 (0.04) | Excellent |
| 2 | 0.64 (0.03) | 0.73 (0.02) | 12.7 (1.2) | 1.15 (0.02) | Good |
| 3 | 0.55 (0.01) | 0.68 (0.01) | 18.7 (1.2) | 1.23 (0.02) | Fair |
| 4 | 0.62 (0.01) | 0.77 (0.02) | 18.7 (1.2) | 1.23 (0.02) | Fair |
| 5 | 0.60 (0.02) | 0.72 (0.02) | 17.3 (1.2) | 1.21 (0.02) | Fair |

*According to European Pharmacopeia 9.0 (2016). Chapter 2.9.36. Powder Flow

TABLE 6f

Flow properties for solid ritonavir (40 wt %) loaded into MMC (i.e. MMC-API). Values are given as mean and (s.d).

| MMC-API | Bulk density [g/ml] | Tapped density [g/ml] | Carr index | Hausner ratio | Flow property* |
|---|---|---|---|---|---|
| 1 | 0.72 (0.01) | 0.75 (0.00) | 4.7 (1.2) | 1.05 (0.01) | Excellent |
| 2 | 0.68 (0.01) | 0.76 (0.01) | 11.3 (1.2) | 1.13 (0.01) | Good |
| 3 | 0.73 (0.02) | 0.81 (0.01) | 10.0 (2.0) | 1.11 (0.02) | Excellent |
| 4 | 0.68 (0.01) | 0.85 (0.02) | 20.0 (2.0) | 1.25 (0.03) | Fair |
| 5 | 0.66 (0.02) | 0.82 (0.03) | 19.3 (1.2) | 1.24 (0.02) | Passable |

*According to European Pharmacopeia 9.0 (2016). Chapter 2.9.36. Powder Flow

Example 7—Particle Size Distribution of Solid Substantially Amorphous APIs

The particulate anhydrous and substantially amorphous mesoporous magnesium carbonate (MMC) was prepared as described in Example 1, with the exception that the final heat-treatment was performed with a 10 hour ramp up to 250° C. and then a 10 hour hold time at 250° C., and then free cooling to room temperature. The MMC was analyzed as described in Material Characterization. The MMC material had an average BET surface area in the range of about 370-440 m²/g, an average pore volume in the range of about 0.55-0.7 cm³/g with about 100% of the pore volume from pores <10 nm in diameter. The particle size distribution of the MMC material exhibited an average $d_{10}$ in the range of about 87-102 μm, an average $d_{50}$ in the rage of about 192-198 μm and an average $d_{90}$ in the range of about 306-319 μm. The magnesium oxide (MgO) used was purchased from Lehmann&Voss&Co.

The different batches of MMC were loaded with the following APIs: 30 wt % dapagliflozin, 30 wt % lesinurad, 30 wt % macitentan, 30 wt % selexipag, 30 wt % ibrutinib, 30 wt % bosutinib, 30 wt % afatinib, 30 wt % osimertinib, and 30 wt % luliconazole respectively, providing solid substantially amorphous APIs (i.e. specific MMC-APIs). The solid substantially amorphous APIs (i.e. the specific MMC-APIs) were prepared and characterized as described in Example 2.

The particle size distribution of each MMC-API was measured using laser diffraction with the Malvern Mastersizer 3000 with a Hydro MV accessory, using a wet method as described above. Measurement duration was 10 seconds background and 10 seconds sample. Six sub runs were made, upon which an average result was calculated. The results are summarized in Table 7 below.

TABLE 7

Particle size distribution for solid substantially amorphous
API (i.e. MMC-API). Values are given as mean and (s.d).

| API | $D_{10}$ [μm] | $D_{50}$ [μm] | $D_{90}$ [μm] |
|---|---|---|---|
| Dapagliflozin | 167 (1.1) | 239 (1.7) | 338 (4.0) |
| Lesinurad | 148 (0.5) | 227 (1.5) | 331 (4.0) |
| Macitentan | 134 (1.3) | 214 (2.5) | 317 (5.4) |
| Selexipag | 103 (1.0) | 186 (1.0) | 303 (1.4) |
| Ibrutinib | 165 (0.5) | 250 (0.8) | 375 (2.4) |
| Bosutinib | 131 (0.8) | 220 (1.1) | 325 (1.5) |
| Afatinib *) | 54.9 (0.8) | 141 (0.5) | 251 (1.6) |
| Osimertinib | 147 (0.5) | 222 (0.8) | 319 (0.8) |
| Luliconazole | 168 (0.8) | 264 (1.5) | 403 (4.7) |

*) The MMC used to prepare the Afatinib MMC-API, exhibited a methanol content >7% since that MMC had not been heat treated as described elsewhere.

Example 8—Preparation and Stability of Particulate Anhydrous and Substantially Amorphous Mesoporous Magnesium Carbonate (MMC)

Figure 9:
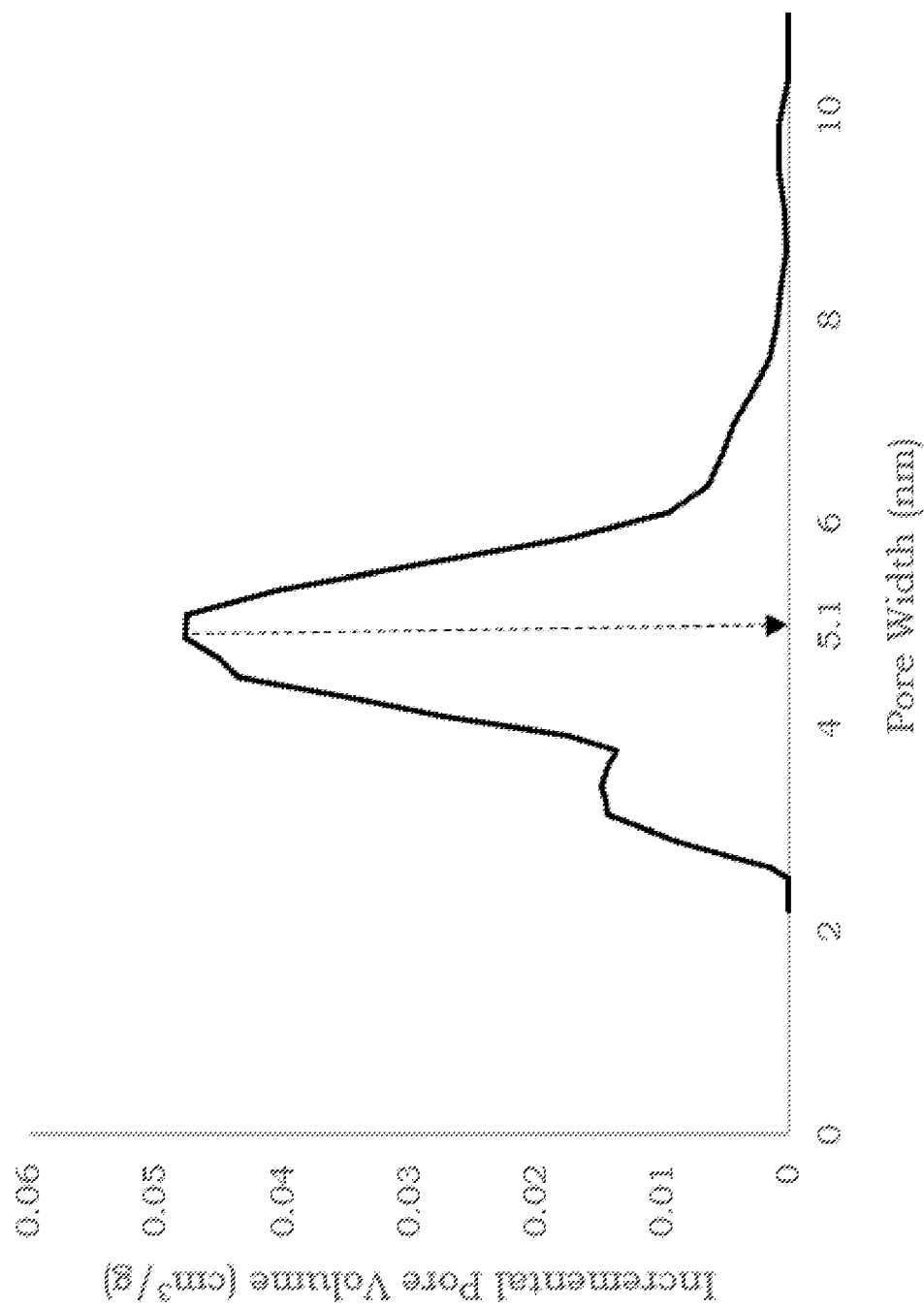
FIG. 9 (Example 8) shows the peak pore width of particulate anhydrous and substantially amorphous mesoporous magnesium carbonate (MMC).
Figure 10:
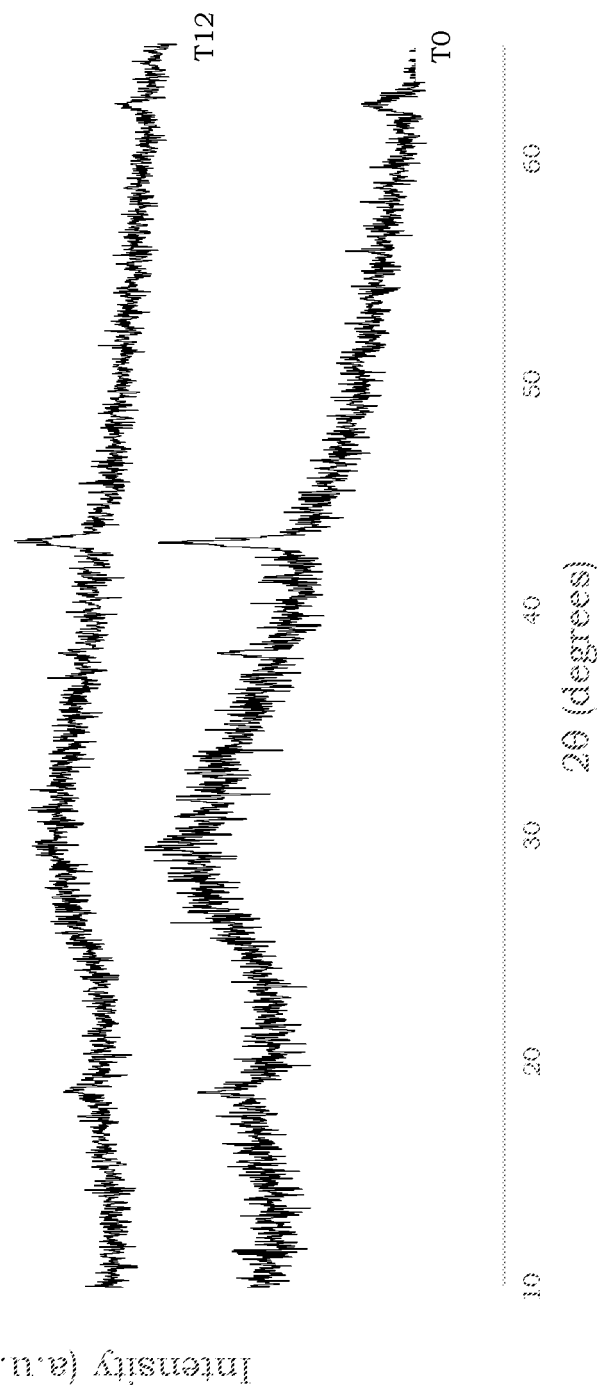
FIG. 10 (Example 8) shows an X-ray powder diffractogram (XRPD) of particulate anhydrous and substantially amorphous mesoporous magnesium carbonate (MMC) prior to (T0) and after (T12) storage at 25° C. and 65% relative humidity. The 2θ range in this figure was limited to 10-65 degrees. T0 and T12 is the time period of storage.

Particulate anhydrous and substantially amorphous mesoporous magnesium carbonate (MMC) was prepared as described and claimed herein. Pore volume, BET surface area and peak pore width from nitrogen gas adsorption analysis is shown in Table 8a. FIG. 9 illustrates the peak pore width extracted from the pore size distribution curve of the MMC. XRPD patterns were obtained as described in Material characterization and reported as shown in Table 8b and FIG. 10. The MMC was stored in a sealed container in a climate chamber having a temperature of 25° C. and 65% relative humidity. After 1 year of storage, the sample was analyzed with XRPD, as described above, to determine whether it was still amorphous, or if it had crystallized (Table 2) and FIG. 10.

TABLE 8a

Pore volume, BET surface area and peak pore width of MMC.

| Pore Volume at p/p$_0$ 0.97 [cm$^3$/g] | BET Surface Area [m$^2$/g] | Peak Pore Width [nm] |
|---|---|---|
| 0.52 | 304 | 5.1 |

TABLE 8b

Physical state of MMC prior to (T0) and after storage at 25° C. and 65% relative humidity for 12 months (T12).

| XRPD amorphous [T0] | XRPD amorphous after storage [T12] |
|---|---|
| Yes | Yes |

The invention claimed is:

1. A solid amorphous pharmaceutical admixture comprising an active pharmaceutical ingredient (API) in combination with a particulate anhydrous mesoporous magnesium carbonate (MMC), wherein the API is sorafenib.

2. The solid amorphous pharmaceutical admixture (MMC-API admixture) according to claim 1, wherein the amount of sorafenib is at least 20% by weight.

3. An oral pharmaceutical formulation comprising the solid amorphous pharmaceutical admixture (MMC-API admixture) of claim 1.

4. An oral pharmaceutical formulation comprising the solid amorphous pharmaceutical admixture (MMC-API admixture) of claim 1, further comprising a pharmaceutically and pharmacologically acceptable excipient, carrier, and/or diluent.

5. A capsule comprising the oral pharmaceutical formulation of claim 3.

6. A tablet comprising the oral pharmaceutical formulation of claim 3.

7. A capsule comprising the oral pharmaceutical formulation of claim 4.

8. A tablet comprising the oral pharmaceutical formulation of claim 4.

9. An oral pharmaceutical formulation comprising the solid amorphous active pharmaceutical admixture (MMC-API admixture) of claim 2.

10. An oral pharmaceutical formulation comprising the solid amorphous pharmaceutical admixture (MMC-API admixture) of claim 2 further comprising a pharmaceutically and pharmacologically acceptable excipient, carrier, and/or diluent.

11. A capsule comprising the oral pharmaceutical formulation of claim 9.

12. A tablet comprising the oral pharmaceutical formulation of claim 9.

13. A capsule comprising the oral pharmaceutical formulation of claim 10.

14. A tablet comprising the oral pharmaceutical formulation of claim 10.

15. A method for the treatment of cancer, the method comprising administering the solid amorphous active pharmaceutical admixture according to claim 1 to a subject in need of such treatment.

16. A method for the treatment of cancer, the method comprising administering the solid amorphous active pharmaceutical admixture according to claim 2 to a subject in need of such treatment.

* * * * *